US010043063B1

(12) United States Patent
Perfido et al.

(10) Patent No.: US 10,043,063 B1
(45) Date of Patent: Aug. 7, 2018

(54) SYSTEMS AND METHODS FOR ASSESSING THE EMOTIONAL RESPONSE OF INDIVIDUALS ON A PANEL

(71) Applicant: The Jury Lab, LLC, Heathrow, FL (US)

(72) Inventors: Susan Perfido, Heathrow, FL (US); Skyler Lauren, Maribel, WI (US); Cody Machak, De Pere, WI (US); Amy Kucksdorf, Green Bay, WI (US); Paul Dax, Green Bay, WI (US); Marla Maney, Green Bay, WI (US); Andrew Higgins, Green Bay, WI (US); Steve McLean, Green Bay, WI (US)

(73) Assignee: The Jury Lab LLC, Heathrow, FL (US)

( * ) Notice: Subject to any disclaimer, the term of this patent is extended or adjusted under 35 U.S.C. 154(b) by 0 days.

(21) Appl. No.: 15/884,777

(22) Filed: Jan. 31, 2018

Related U.S. Application Data

(60) Provisional application No. 62/452,516, filed on Jan. 31, 2017, provisional application No. 62/490,351, filed on Apr. 26, 2017.

(51) Int. Cl.
*G06K 9/00* (2006.01)
*G06Q 50/18* (2012.01)

(52) U.S. Cl.
CPC ......... *G06K 9/00315* (2013.01); *G06Q 50/18* (2013.01)

(58) Field of Classification Search
CPC ... G06K 9/00; G06K 9/00221; G06K 9/00979
See application file for complete search history.

(56) References Cited

U.S. PATENT DOCUMENTS

2013/0300900 A1* 11/2013 Pfister ................ G06K 9/00315 348/239
2014/0050408 A1* 2/2014 Balasubramanian .......................... G06K 9/00281 382/195

* cited by examiner

*Primary Examiner* — Duy M Dang
(74) *Attorney, Agent, or Firm* — Sunstein Kann Murphy & Timbers LLP

(57) ABSTRACT

A computer-implemented method assesses emotional responses of a panel of individuals to a user-defined event in a presentation. The method records video recordings of a presentation and a panel observing the presentation so that the video recordings may be synchronized with one another. The panel recording is processed to obtain emotional expression data for each face, in each frame, for the duration of the recording. A user may define the beginning and ending of an event in the presentation. The user may selected individuals of interest from the panel, as well as metrics regarding the emotional expressions. The method extracts emotional expression data meeting the requirements of user and displays the data.

20 Claims, 27 Drawing Sheets

Recording presentation and panel observing the presentation 105

Processing recording of panel for emotional responses of individuals 110

Organizing and displaying emotional respones to events in presentation 115

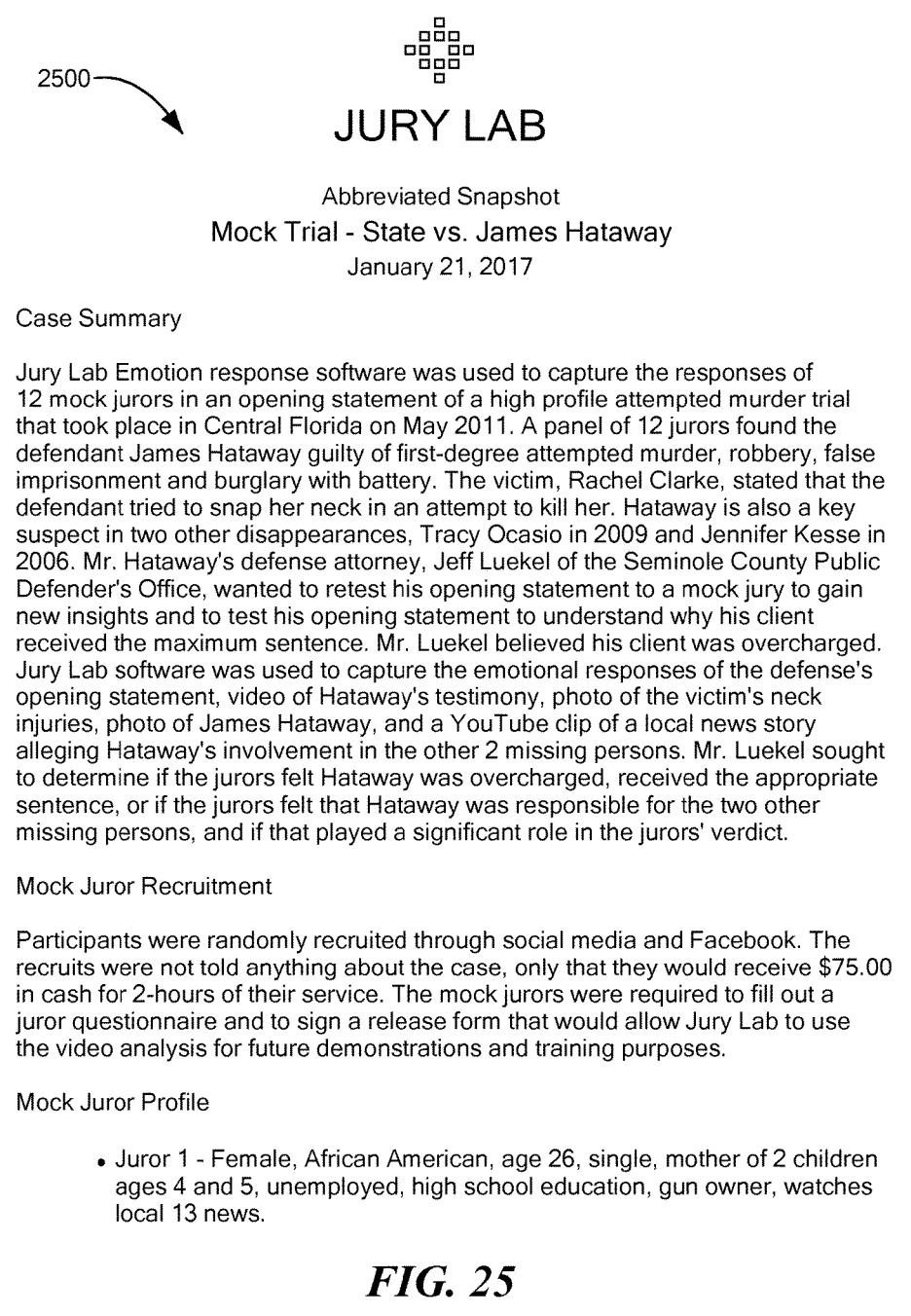

2500

JURY LAB

Abbreviated Snapshot

Mock Trial - State vs. James Hataway

January 21, 2017

Case Summary

Jury Lab Emotion response software was used to capture the responses of 12 mock jurors in an opening statement of a high profile attempted murder trial that took place in Central Florida on May 2011. A panel of 12 jurors found the defendant James Hataway guilty of first-degree attempted murder, robbery, false imprisonment and burglary with battery. The victim, Rachel Clarke, stated that the defendant tried to snap her neck in an attempt to kill her. Hataway is also a key suspect in two other disappearances, Tracy Ocasio in 2009 and Jennifer Kesse in 2006. Mr. Hataway's defense attorney, Jeff Luekel of the Seminole County Public Defender's Office, wanted to retest his opening statement to a mock jury to gain new insights and to test his opening statement to understand why his client received the maximum sentence. Mr. Luekel believed his client was overcharged. Jury Lab software was used to capture the emotional responses of the defense's opening statement, video of Hataway's testimony, photo of the victim's neck injuries, photo of James Hataway, and a YouTube clip of a local news story alleging Hataway's involvement in the other 2 missing persons. Mr. Luekel sought to determine if the jurors felt Hataway was overcharged, received the appropriate sentence, or if the jurors felt that Hataway was responsible for the two other missing persons, and if that played a significant role in the jurors' verdict.

Mock Juror Recruitment

Participants were randomly recruited through social media and Facebook. The recruits were not told anything about the case, only that they would receive $75.00 in cash for 2-hours of their service. The mock jurors were required to fill out a juror questionnaire and to sign a release form that would allow Jury Lab to use the video analysis for future demonstrations and training purposes.

Mock Juror Profile

- Juror 1 - Female, African American, age 26, single, mother of 2 children ages 4 and 5, unemployed, high school education, gun owner, watches local 13 news.

*FIG. 25*

Figure 26:
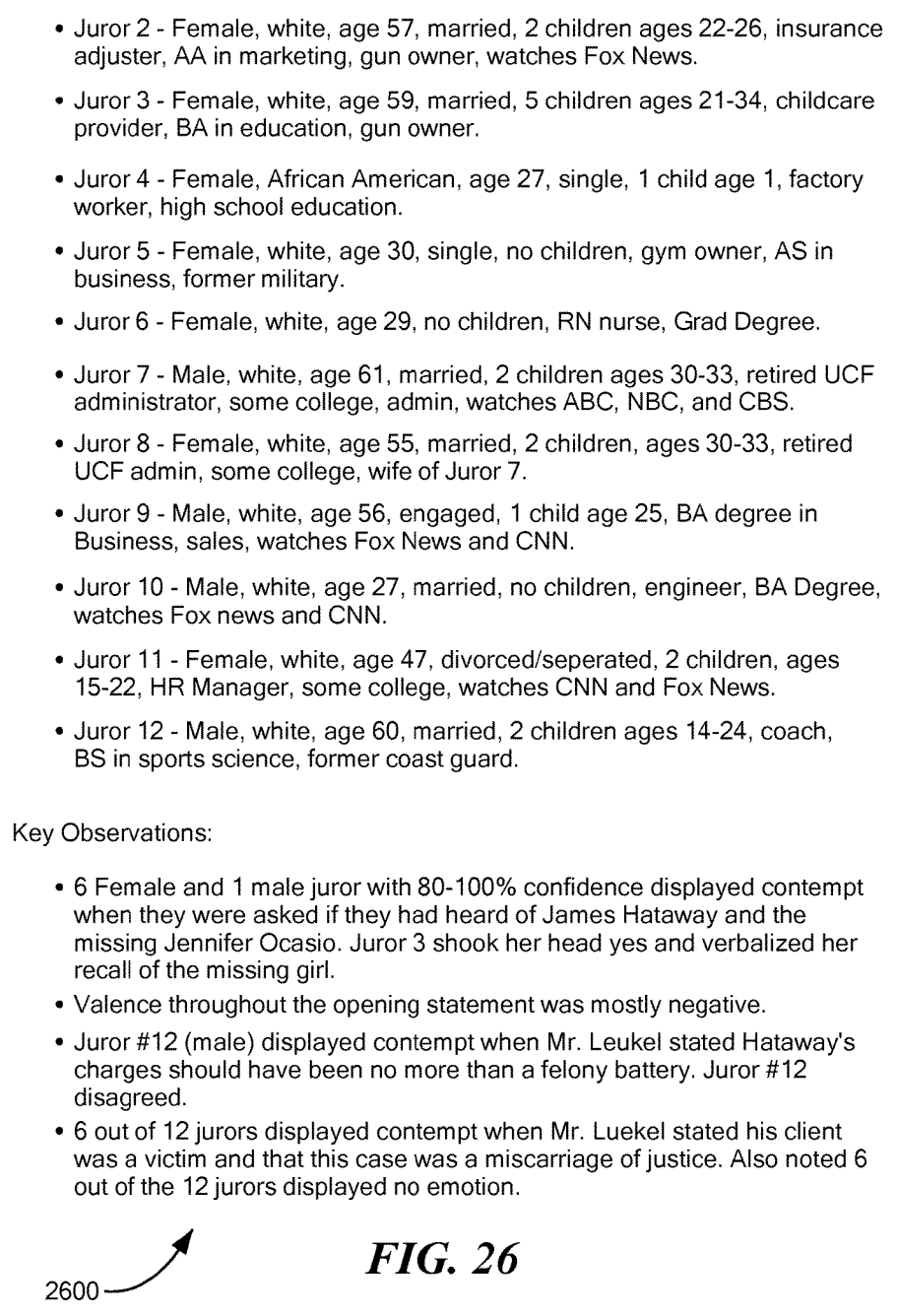

- Juror 2 - Female, white, age 57, married, 2 children ages 22-26, insurance adjuster, AA in marketing, gun owner, watches Fox News.
- Juror 3 - Female, white, age 59, married, 5 children ages 21-34, childcare provider, BA in education, gun owner.
- Juror 4 - Female, African American, age 27, single, 1 child age 1, factory worker, high school education.
- Juror 5 - Female, white, age 30, single, no children, gym owner, AS in business, former military.
- Juror 6 - Female, white, age 29, no children, RN nurse, Grad Degree.
- Juror 7 - Male, white, age 61, married, 2 children ages 30-33, retired UCF administrator, some college, admin, watches ABC, NBC, and CBS.
- Juror 8 - Female, white, age 55, married, 2 children, ages 30-33, retired UCF admin, some college, wife of Juror 7.
- Juror 9 - Male, white, age 56, engaged, 1 child age 25, BA degree in Business, sales, watches Fox News and CNN.
- Juror 10 - Male, white, age 27, married, no children, engineer, BA Degree, watches Fox news and CNN.
- Juror 11 - Female, white, age 47, divorced/seperated, 2 children, ages 15-22, HR Manager, some college, watches CNN and Fox News.
- Juror 12 - Male, white, age 60, married, 2 children ages 14-24, coach, BS in sports science, former coast guard.

Key Observations:

- 6 Female and 1 male juror with 80-100% confidence displayed contempt when they were asked if they had heard of James Hataway and the missing Jennifer Ocasio. Juror 3 shook her head yes and verbalized her recall of the missing girl.
- Valence throughout the opening statement was mostly negative.
- Juror #12 (male) displayed contempt when Mr. Leukel stated Hataway's charges should have been no more than a felony battery. Juror #12 disagreed.
- 6 out of 12 jurors displayed contempt when Mr. Luekel stated his client was a victim and that this case was a miscarriage of justice. Also noted 6 out of the 12 jurors displayed no emotion.

00:10:08 - 00:10:40 Seconds
Mr. Luekel stated that his client will more likely spend the rest of his life in prison for what "I would legally say...is nothing more than a felony battery."

Juror 12 (male) displayed contempt that Hataway's charges should have been reduced to a felony battery - 80% confidence

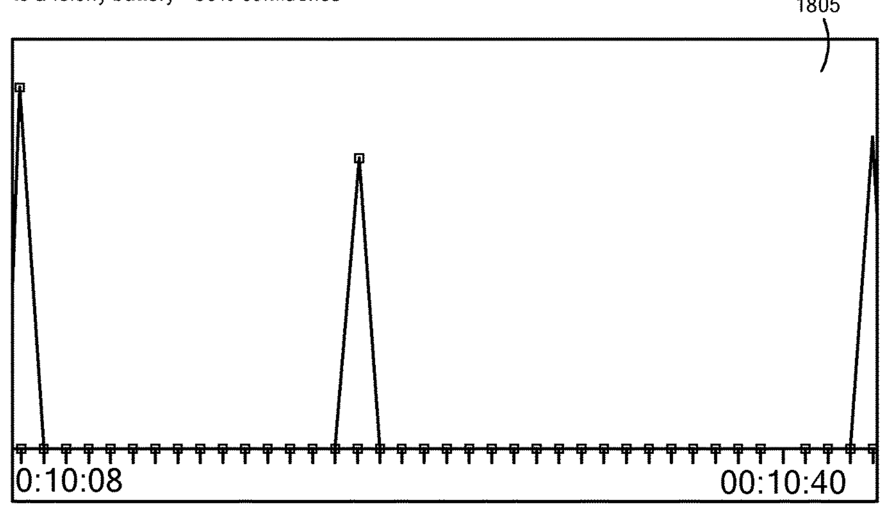

00:10:40 - 00:11:12 Seconds
Photo of Hataway Ontroduced while Mr Luekel speaks to Halaway's sentence. Leukel states his client "was victim as much as anybody else in the states and the consequence was one of the miscarriages of justice he has ever been involved in."

Jurors 2,3,5,6,7,8, displayed contempt with 90 - 100% confidence

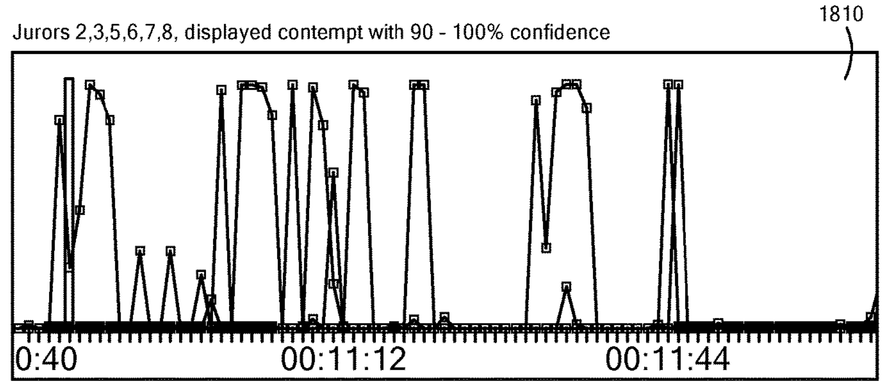

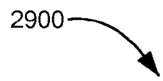

Conclusion

- Based on the level of contempt with 50% - 60% of jurors and no emotion from the remaining jurors, the likelihood that the defendant would have received a lower sentence is highly unlikely.
- Juror 12 (male) felt the charges should not have been reduced where the remaining jurors had no emotion.
- At the mention of Mr. Hataway and the missing Jennifer Ocasio's names, 7 out of 11 jurors displayed a negative emotion of contempt.
- The overall juror experience was negative or unfavorable.
- 6 out of 12 jurors did not agree with the defense's theory that Hataway's charges were a miscarriage of justice or that Hattaway was a victim in this case.

*FIG. 29*

SYSTEMS AND METHODS FOR ASSESSING THE EMOTIONAL RESPONSE OF INDIVIDUALS ON A PANEL

RELATED APPLICATIONS

This application claims the benefit of U.S. Provisional Patent Application No. 62/452,516, entitled "System to Determine Emotional States of Jurors Using Facial Recognition and Associated Methods" and filed Jan. 31, 2017, and U.S. Provisional Patent Application No. 62/490,351, entitled "System to Determine Emotional States of Jurors Using Facial Recognition and Associated Methods" and filed Apr. 26, 2017, which are hereby incorporated by reference in their entireties.

TECHNICAL FIELD

The present invention relates to assessing the emotional response of individuals on a panel to a presentation, particularly the emotional response of individuals of interest to a user-defined event during the presentation.

BACKGROUND ART

Although known techniques for image analysis can detect a face in an image and analyze the expression of the face for emotional content, the techniques can only be applied to individual, static images.

SUMMARY OF THE EMBODIMENTS

In accordance with one embodiment of the invention, a computer-implemented method assesses emotional responses of a panel of individuals to a user-defined event in a presentation. The method is carried out by a computer system performing computer processes. The processes include associating, with a first file, a first video recording and an audio recording being made of a presentation captured by a first camera and, with a second file, a second video recording being made of the panel observing the presentation captured by a second camera. The processes also include storing the first and second files in a database, in association with a session identifier for the presentation. The processes also include receiving, by the computer system, for each individual in the panel, an identified location of such individual in an image captured by the second camera. The processes also include storing the identified locations in the database in association with the session identifier. The processes also include completing recordation of content of the presentation in the first and second files. The processes also include, during or after the recordation, receiving and storing, in association with the session identifier, a user input flagging a beginning and an ending for the event. The processes also include, for each frame in a set of frames in the second video recording of the panel observing the presentation, processing the second file.

Processing the second file includes sending such frame to an emotion analyzer subsystem. Processing the second file further includes receiving, from the emotion analyzer subsystem, a data array for such frame that for each face in such frame, specifies a location of such face in the frame and emotional expression data corresponding to an emotional expression of such face. Processing the second file includes matching the location of each face in the data array with the corresponding location of the identified individual. Processing the second file includes storing in the database, for each face in the data array for which there is a match with the corresponding identified individual, the emotional expression data and an identifier for the frame in association with the corresponding identified individual.

The processes also include using the beginning and ending flags to identify frames associated with the event. The processes also include using the identified frames to locate and extract, from the database, emotional expression data for the set of individuals of interest associated with the event. The processes also include displaying the extracted data.

The identified location for each individual may correspond to a center of a face of the individual in the image, and the location of a face provided in the data array corresponds to boundaries circumscribing the face in the frame. The location of each face in the data array may be matched with the corresponding location of the identified individual by determining the individual whose identified location falls within the boundaries circumscribing the face in the frame. The identified location for each individual may represented by a pair of coordinates and the boundaries circumscribing the face in the frame may be defined by four pairs of coordinates.

The emotional expression data may include metrics selected from the group consisting of anger, attention, contempt, disgust, engagement, fear, joy, sadness, surprise, valence, and combinations thereof. The emotional expression data may include data indicating the presence of a gesture selected from the group consisting of furrowed eyebrow, raised eyebrow, raised chin, closed eyes, depressed corner of a lip, pressed lips, puckered lips, open mouth, wrinkled nose, smile, smirk, raised upper lip, and combinations thereof.

The processes may also include storing flag data defining, within the presentation, first and second durations from the start of recordation to the beginning and to the ending of the event. The flag data may be used to identify the frames with time stamps falling between the beginning and the ending of the event. A first frame identifier, corresponding to the beginning frame of the event, may be determined by multiplying the first duration by the frame rate of a camera. A second frame identifier, corresponding to the ending frame of the event, may be determined by multiplying the second duration by the frame rate of the camera.

The processes may also include receiving, from a user, a selection of at least one individual of interest in the panel and a selection of at least one metric of emotional expression of interest. Emotional expression data associated with the at least one selected metric for the at least one selected individual of interest may be extracted from the database. The processes may also include displaying, for each selected individual of interest, the emotional expression data associated with the at least one selected metric as a line graph between the beginning and the ending of the event. The processes may also include determining, for each selected individual of interest and for each selected metric, a value, of the emotional expression data for the frames associated with the event, selected from the group consisting of an average value, a maximum value, a minimum value, combinations thereof. The processes may also include displaying, for each selected individual of interest and for each selected metric, the average value, the maximum value, and the minimum value of the emotional expression data for the frames associated with the event.

In accordance with another embodiment of the invention, a computer program product, including a non-transitory computer readable medium, has computer code thereon for assessing emotional responses of a panel of individuals to a user-defined event in a presentation. The computer program product includes program code for executing any of the steps described above.

BRIEF DESCRIPTION OF THE DRAWINGS

The foregoing features of embodiments will be more readily understood by reference to the following detailed description, taken with reference to the accompanying drawings, in which:

FIGS. 25-29 is a sample of an exemplary report that may be created using the system of FIG. 2.

DETAILED DESCRIPTION OF SPECIFIC EMBODIMENTS

Figure 1:
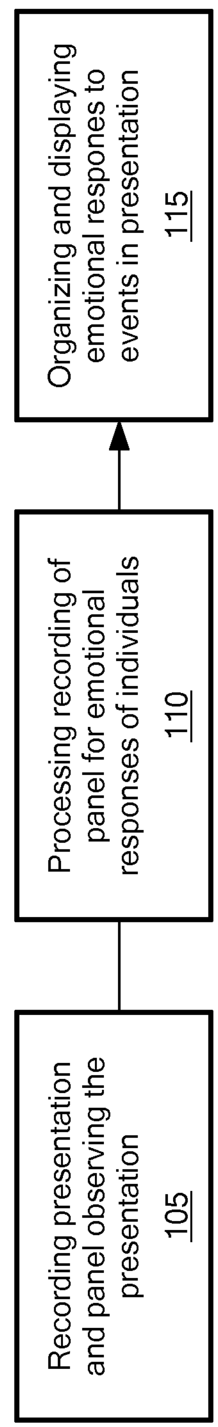
FIG. 1 is a block diagram illustrating logical processes involved in carrying out synchronized recording of a presentation and panel observing the presentation, processing of the recording of the panel for emotional responses of the individuals, and organizing the emotional responses for display.

Definitions. As used in this description and the accompanying claims, the following terms shall have the meanings indicated, unless the context otherwise requires:

A "set" includes at least one member.

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

A "panel of individuals" is a set of individuals.

A "video recording" can, but does not necessarily, include audio content.

A "session" includes a synchronized video recording of a presentation and a video recording of a panel observing the presentation.

Embodiments of the systems and methods of this disclosure enable users to assess the emotional responses of individuals on a panel to events in a presentation. By assessing individuals' emotional responses, the presenter may determine how effectively particular events in the presentation persuaded one or more individuals on the panel to adopt a position, or more generally, which events in the presentation were favored or disfavored by the panel. Exemplary applications for this disclosure include, but are not limited to, presentations for jury trials (e.g., arguments, exhibits, witness testimonies), depositions of persons of interest in legal proceedings, market research (e.g., product pitches), media (e.g., commercial trailers for movies), or any organization seeking to conduct focus groups. Depending on the context, the presenter may use the emotional responses of the panel to refine the presentation, predict an outcome dependent on the presentation, or deduce information about demographics based on emotional responses.

Embodiments of the system simultaneously record the presentation and the panel observing the presentation, synchronizes the two video recordings, and analyzes each frame of the panel recording regarding the emotional expressions of the panel. To define an event in the presentation, a user selects beginning and ending times within the presentation. Moreover, the user may identify individuals on the panel of interest, as well as particular metrics of the emotional expressions, of interest. Because the video recordings of the presentation and panel are synchronized, embodiments of the system can retrieve emotional expression data collected during the event, and display the data for the user to assess.

FIG. 1 is a block diagram illustrating logical processes involved in carrying out synchronized recording of a presentation and panel observing the presentation, processing of the recording of the panel for emotional responses of the individuals, and organizing the emotional responses for display. The processes include recording a presentation and a panel observing the presentation (step 105). The video recordings may be obtained simultaneously and stored together, in association with a session identifier. For example, two cameras may be configured to provide video and/or audio content to embodiments of the system. To record a session, embodiments of the system store the content from the cameras in files, one for the presentation recording, and the other for the panel recording. Each frame from the cameras is stored in the video recording file with a time stamp, which are used to synchronize playback of the video recordings.

The processes include processing the recording of the panel for emotional responses of individuals (step 110). The user identifies the locations of the individuals' faces. Each frame of the panel recording is processed to detect faces and analyze their emotional expressions, and each face is matched with an individual identified by the user. The emotional expression data of the face is stored in an emotion data file for the individual, in association with an identifier of the frame. Thus, embodiments of the system catalog the emotional expressions of each individual on the panel, for each frame in the video recording of the panel observing the presentation.

The processes include organizing and displaying emotional responses to events in the presentation (step 115). The user may define an event by selecting beginning and ending times within the video recording of the presentation. Additionally, the user may select individuals of interest on the panel of interest, as well as metrics of emotional expression of interest. Embodiments of the system extract, from the stored emotional expression data, the data associated with the selected metrics that was captured during the user-defined event for the selected individuals. This data is displayed to the user. The user may change his or her selection of individuals and/or metrics to assess the emotional response of the panel to the event from a different perspective, and the display is updated accordingly. Consequently, the user gains a multi-dimensional understanding of the panel's emotional response to events in the presentation.

Figure 2:
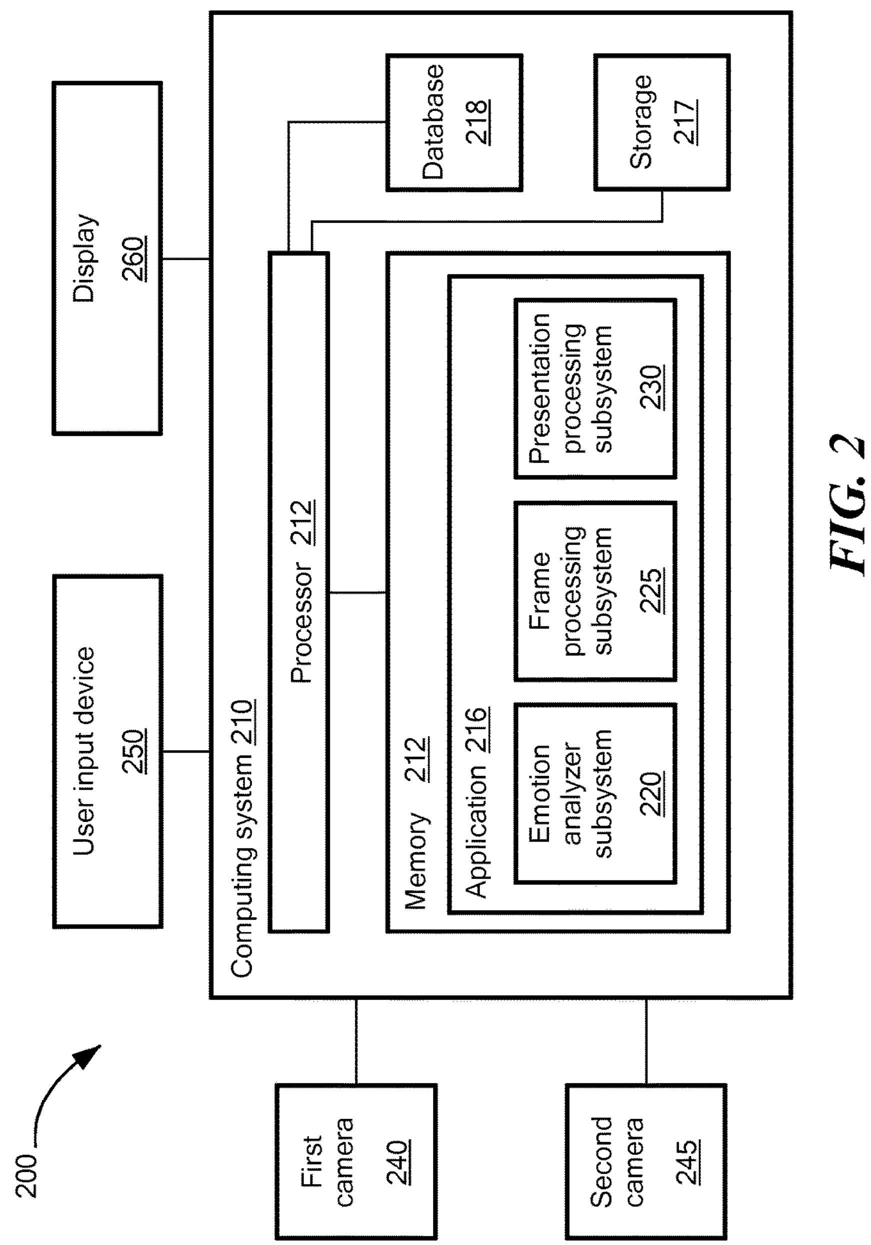
FIG. 2 is a block diagram of a system for executing the logical processes of FIG. 1.

FIG. 2 is a schematic block diagram of a system 200 for executing the logical processes of FIG. 1. The system 200 includes a first camera 240 and a second camera 245, each of which provides video and/or audio content to the computing system 210. The computing system 210 includes a processor 212 and a memory 212. The memory 212 stores instructions that, when executed by the processor 212, runs an application 216 with an emotion analyzer subsystem 220, a frame processing subsystem 225, and a presentation processing subsystem 230. The frame processing subsystem 225 processes the audio-video content from the first and second cameras 240, 245 to create and store video recordings of the presentation and panel in storage 217. The emotion analyzer subsystem 220 processes the panel recordings and stores the emotional expression data of detected faces, for each frame of the panel recording, in the database 218. The user operates the user input device 250 to define events in the presentation, select individuals of interest, and metrics of emotional expression of interest. The presentation processing subsystem 230 retrieves the emotional expression data meeting the user's requirements from the database 218 and organizes the data to be output to the display 260.

Figure 3:
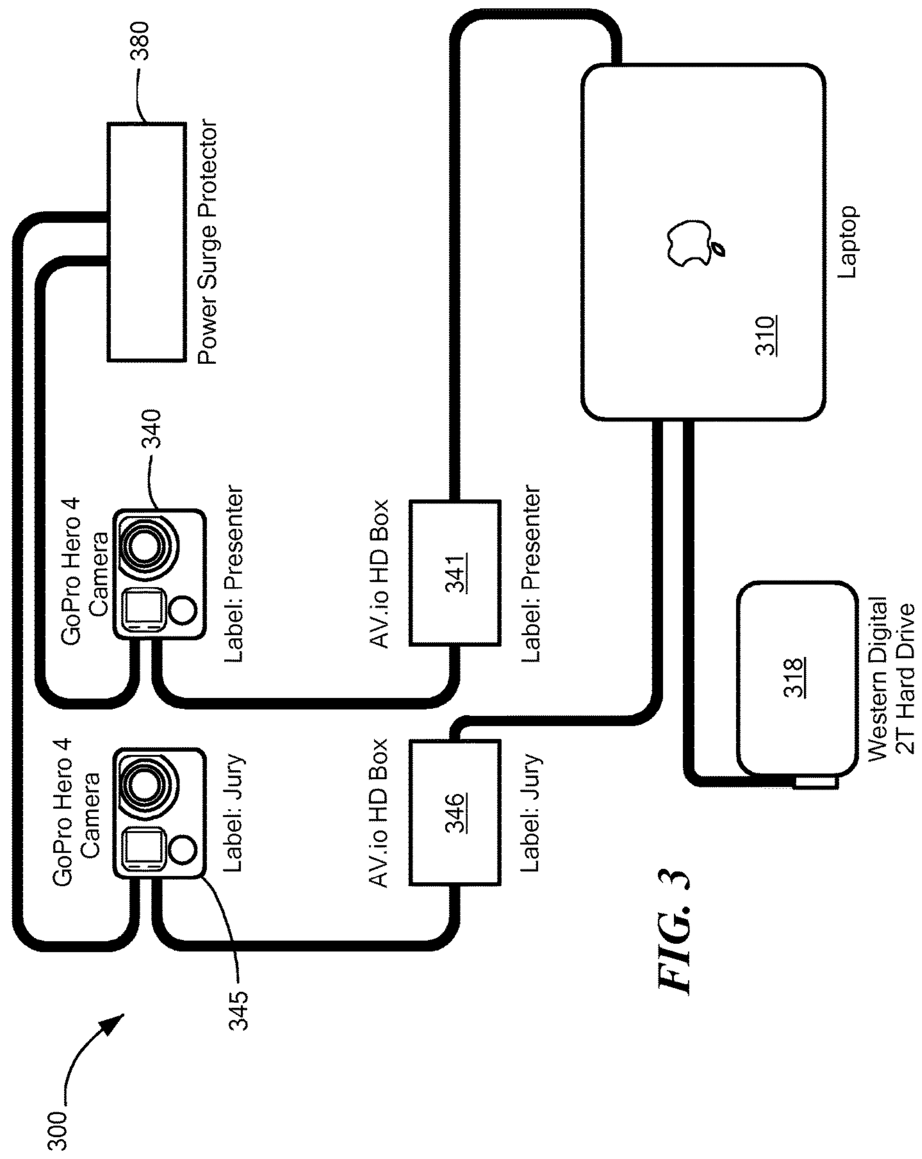
FIG. 3 is a block diagram illustrating exemplary devices used in the system of FIG. 2.

FIG. 3 is a block diagram illustrating exemplary devices used in the system of FIG. 2. The computing system 210 may be a laptop computer 310 with a processor (not shown) that executes the application 216 that runs the emotion analyzer subsystem 220, the frame processing subsystem 225, and the presentation processing subsystem 230. The keyboard, mouse, and touchscreen of the laptop computer 310 may serve as user input devices 250, and the screen may serve as the display 260. Moreover, in this system 300, an external hard drive 318 may include storage 217 for the video recordings of the sessions and the database 218 that stores the emotional expression data for the panel recordings. The cameras 340, 345 may be a pair of GoPro Hero 4 cameras, manufactured by GoPro, Inc. of San Mateo, Calif., which are connected to the laptop computer 310 via I/O devices 341, 346, respectively. The cameras 340, 345 also connect to a power surge protector 380 to receive power.

Figure 4:
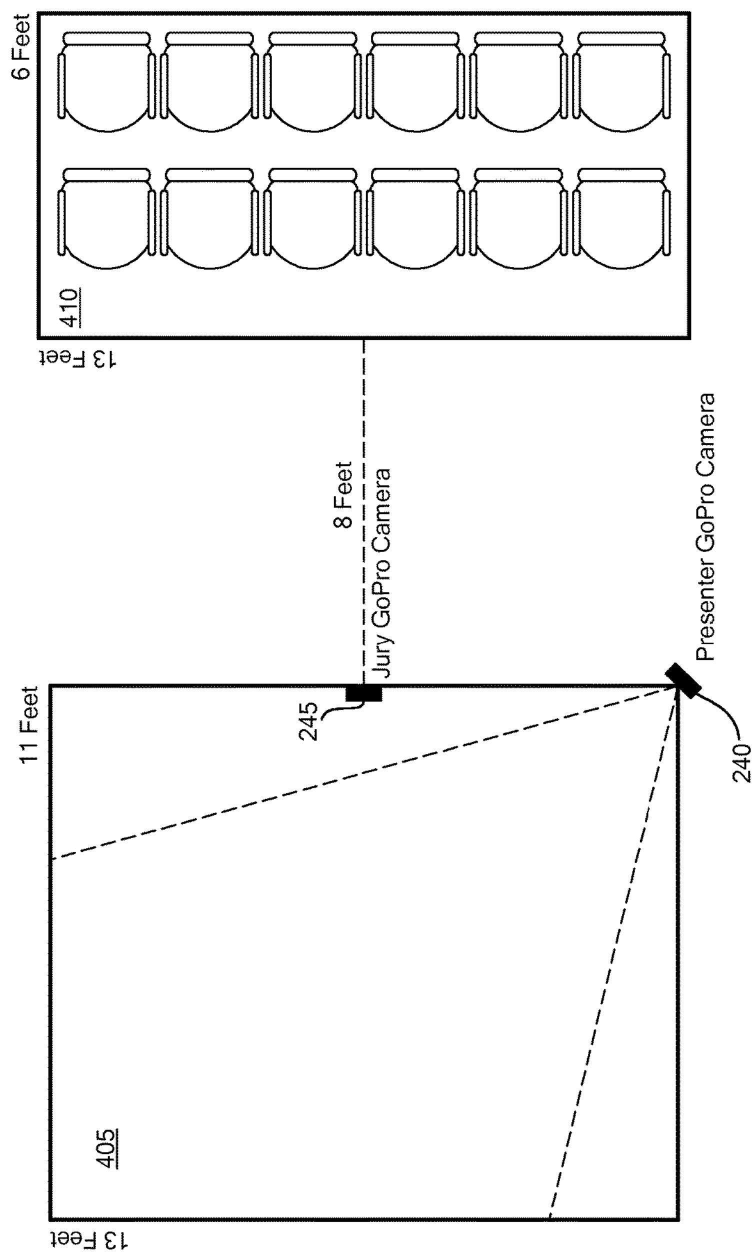
FIG. 4 is a schematic diagram illustrating a configuration of the cameras of the system of FIG. 2 for capturing recordings of the presentation and the panel.

FIG. 4 is a schematic diagram illustrating a configuration of the cameras of the system of FIG. 2 for capturing recordings of the presentation and the panel. In this embodiment, the staging area 405 for a presentation is rectangular, with dimensions of 11 feet by 13 feet. A first camera 240 may be positioned at a corner of the staging area 405, at an oblique angle, to maximize the amount of the staging area 405 visible to the lens of the first camera 240. Additionally, the individuals of the panel may be seated on a viewing stage 410, which in this embodiments, is a rectangular area measuring 6 feet by 13 feet. In this embodiment, the individuals are arranged in two rows, each of which includes six chairs. However, the panel may include other numbers of individuals, arranged in other configurations. The staging area 405 and viewing stage 410 are separated by a distance of 8 feet, and the second camera 245 may be positioned along one edge of the staging area 405 and oriented to face the panel. In all embodiments, the second camera 245 is positioned such that all of the faces of the individuals on the panel will be visible in the frames captured by the second camera 245.

Figures 5A, 5B:
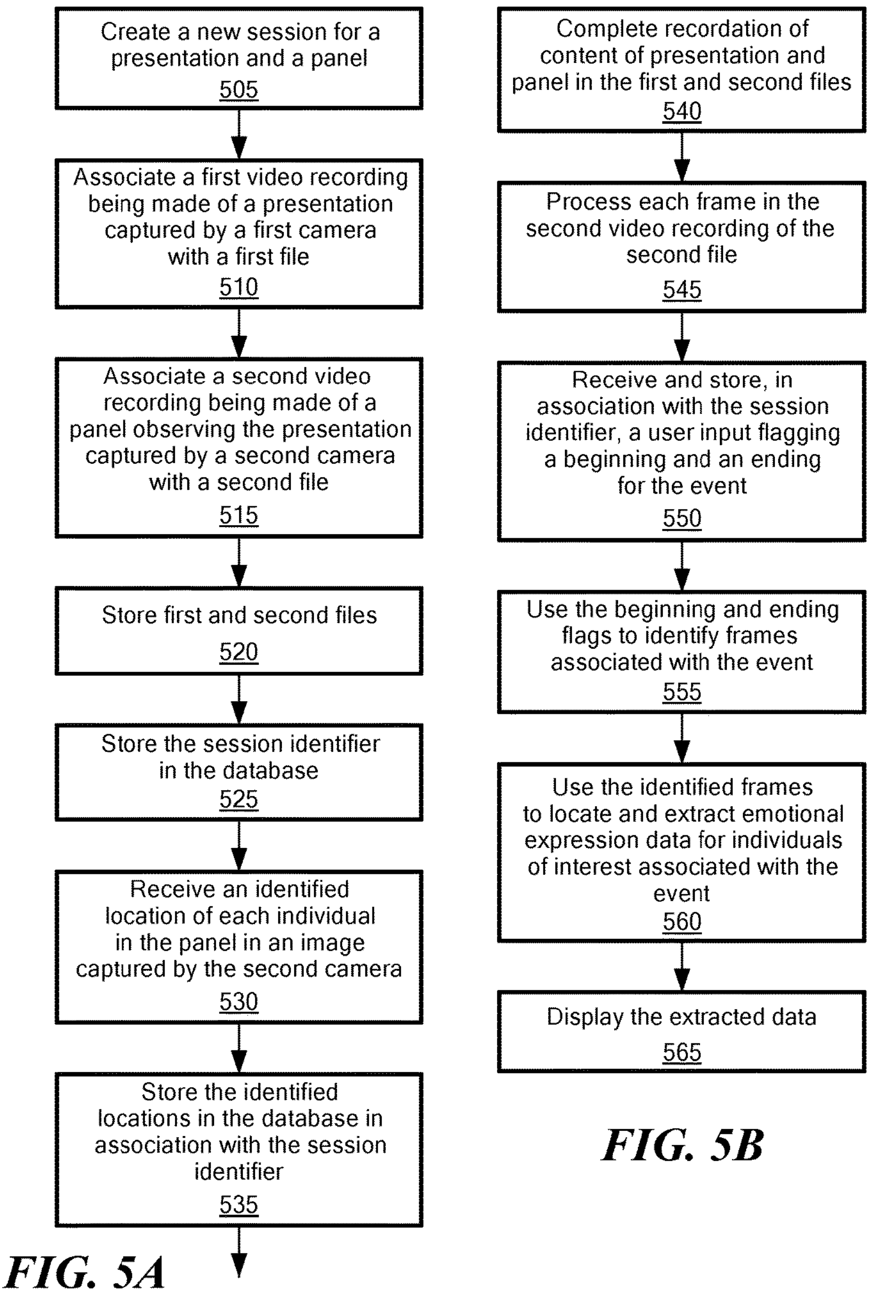
FIGS. 5A-5B are block diagrams illustrating logical processes involved in synchronized recording of a presentation and a panel of individuals, processing of the recording of the panel for emotional expression data of the individuals, and extracting emotional expression data associated with an event, for individuals of interest, for display.

FIGS. 5A-5B are block diagrams illustrating logical processes involved in synchronized recording of a presentation and a panel of individuals, processing of the recording of the panel for emotional expression data of the individuals, and extracting emotional expression data associated with an event, for individuals of interest, for display. The processes include creating, by the user, a new session for a presentation and a panel (step 505). In response to a user command to create a new session, the application 216 creates an identifier for the session. The user may configure two cameras 240, 245 to provide audiovisual content to the computing system 210, and designate one camera 240 to provide content for the presentation recording and the other camera 245 to provide content for the panel recording. The first video recording being made of the presentation and captured by the first camera 240 is associated with a first file (step 510), and a second video recording being made of a panel observing the presentation captured by a second camera 245 is associated with a second file (step 515). The application 216 stores the files in storage 217 (step 520), and the session identifier is stored in the database 218 in association with pointers to the files of the session in storage 217 (step 525).

The computing system 210 displays the video content from the second camera 245 facing the panel. From an image captured by the second camera 245, the user identifies the location of each individual in the panel (step 530). For example, the user may select locations corresponding to the centers of the faces of the individuals. The application 216 stores the identified locations in the database 218 in association with the session identifier (step 535).

When the user inputs a command to begin recording, the frame processing subsystem 225 processes audiovisual content from the cameras 240, 245 for storage as video recording files. The user also inputs a command to top recording, and the application 216 completes recordation of the content of the presentation and panel in the first and second files (step 540). When the user instructs the application 216 to process the session, the emotion analyzer subsystem 220 processes each frame in the second video recording of the second file (step 545). The emotion analyzer subsystem 220 detects faces in the frame and analyzes the emotional expression of each face. The frame processing subsystem 225 matches each detected face with an individual of the panel, and stores the emotional expression data of the face in the emotion data file of the corresponding individual in the database 218, in association with the identifier of the frame. By performing these steps for every frame in the panel recording, the application 216 creates a database of every emotional expression of every individual on the panel while watching the presentation.

The presentation processing subsystem 230 receives and stores, in association with the session identifier, a user input flagging a beginning and an ending for the event (step 550). For example, the user may scroll to a position within the presentation, flag that position as the beginning of an event, scroll to a later position, and flag that position as the end of the event. The user may provide a name for the event. The computing system 210 may also store the name of the event with the flags.

The presentation processing subsystem 230 uses the beginning and ending flags to identify frames associated with the event (step 555). In some embodiments, the beginning and ending flags correspond to durations of time that have elapsed since the start of the panel recording. By multiplying each duration of time by the frame rate of the second camera 245 oriented towards the panel, the presentation processing subsystem 230 determines the identifiers for frames captured during the event. Thus, the presentation processing subsystem 230 can identify the range of frame identifiers corresponding to the user-defined event.

The identified frames are used to extract emotional expression data for individuals of interest associated with the event (step 560). As mentioned above, the presentation processing subsystem 230 determines the frames captured during the event, based on their identifiers. The user selects the individuals of the panel and/or the metrics of emotional expression data of interest, and the presentation processing subsystem 230 extracts from the database 218 the emotional expression data associated with the selected individuals, the selected metrics, and the range of frames for the event. The presentation processing subsystem 230 then displays the extracted data to the user on the display 262 (step 565).

Figure 6:
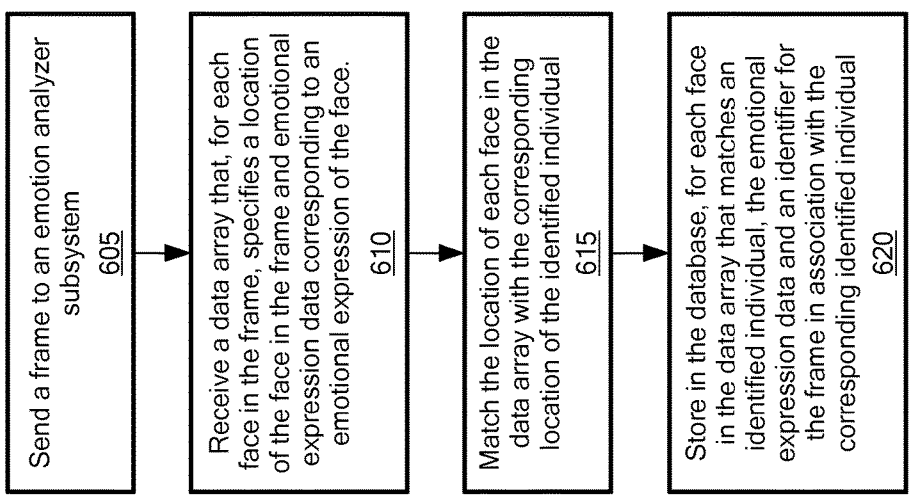
FIG. 6 is a block diagram illustrating logical processes involved in processing a frame of a recording of the panel to obtain emotional expression data for individuals detected in the frame.

FIG. 6 is a block diagram illustrating logical processes involved in processing a frame of a recording of the panel to obtain emotional expression data for individuals detected in the frame. Each frame in the panel recording is sent to the emotion analyzer subsystem 220 (step 605), which detects faces in the frame. The emotion analyzer subsystem 220 identifies the location of each detected face. In some embodiments, the location corresponds to boundaries that circumscribe the face within the frame, and may be represented by four pairs of coordinates.

The emotion analyzer subsystem 220 analyzes each detected face for its emotional expression. A face may be analyzed for emotions such as anger, attention, contempt, disgust, engagement, fear, joy, sadness, or surprise, and may be further analyzed for valence (e.g., overall positive or negative emotional states). The analysis may assign a value for each emotion that represents the likelihood that that particular emotion is expressed in the face. A face may be also analyzed for the presence of a gesture, such as a furrowed eyebrow, raised eyebrow, raised chin, closed eyes, depressed corner of a lip, pressed lips, puckered lips, open mouth, wrinkled nose, smile, smirk, or raised upper lip. Values for the gestures may be binary, indicating the presence or absence of the gesture. Alternatively, the values may represent the likelihood that the gesture is present in the face. These values are referred to herein as the emotional expression data. Because gestures may be proxies for underlying emotions (e.g., a furrowed eyebrow may express contempt or anger), data regarding gestures enables users to assess responses of panel members from different perspectives.

After detecting and analyzing every face in the frame, the emotion analyzer subsystem 220 organizes the locations and emotional expression data of the faces in a data array, and provides the data array to the frame processing subsystem 225. The frame processing subsystem 225 receives the data array that, for each face in the frame, specifies a location of the face in the frame and emotional expression data corresponding to an emotional expression of the face (step 610).

The frame processing subsystem 225 matches the location of each face in the data array with the corresponding location of the identified individual (step 615). As discussed above, the application 216 may have received, from the user, selected locations corresponding to the center of the faces of the individuals in the panel. The frame processing subsystem 225 may parse the data array for the locations of faces, represented by the boundaries that circumscribe the faces in the frame. If the location of an individual falls within the boundaries of a detected face, i.e., the center of the individual's face falls within the boundaries circumscribing a face detected in the frame, then the detected face matches the individual.

For each face in the data array that matches an identified individual, the computing system 210 stores, in the database, the emotional expression data for the detected face and the identifier for the frame in association with the corresponding identified individual (step 620). In some embodiments, the emotional expression data and frame identifier are added to an emotion data file for the individual. As the application 216 processes each frame in the panel recording, the application 216 effectively catalogs every emotional expression of every individual on the panel for the duration of the presentation.

Figure 7:
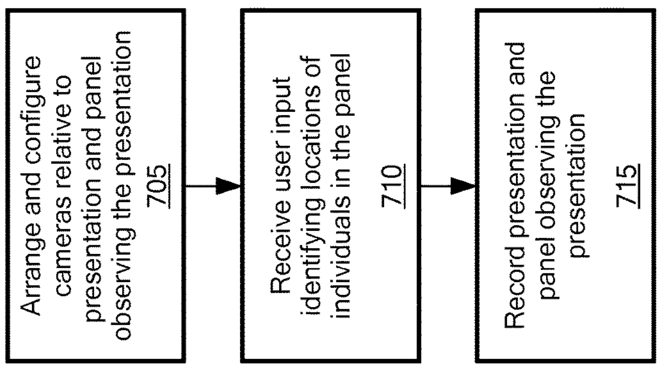
FIG. 7 is a block diagram illustrating processes involved in configuring and operating the system of FIG. 2 to synchronize recording of a presentation and panel.

FIG. 7 is a block diagram illustrating processes involved in configuring and operating the system of FIG. 2 to synchronize recording of a presentation and panel. A user arranges and configures cameras 240, 245 relative to the presenter who will give a presentation and the panel that will observe the presentation (step 705). As previously described, the user can select a staging area 405 to host the presenter and a viewing stage 410 to seat the panel, and orient the first camera 240 to capture the presenter and the second camera 245 to capture the panel. The second camera 245 is arranged to capture all of the faces of the individuals, such that none of the faces are obstructed by another face or body. From the application 216, the user may configure a session to accept audiovideo content from the first camera 240 to create the video recording file of the presentation, and to accept the video content from the second camera 245 to create the video recording file of the panel.

The application 216 receives the user input identifying locations of individuals in the panel (step 710). When the user selects an instruction to identify an individual for the panel, the application 216 may display the next frame received from the second camera 245, and temporarily disregard subsequent frames that the second camera 245 provides. The user may identify the locations of individuals on this image. When the presentation begins, the user may input a command to begin recording. In response, the frame processing subsystem 225 records the presentation and panel observing the presentation (step 715). Frames from the first and second cameras 240, 245 are processed and stored in video recording files in storage 217.

Figure 8:
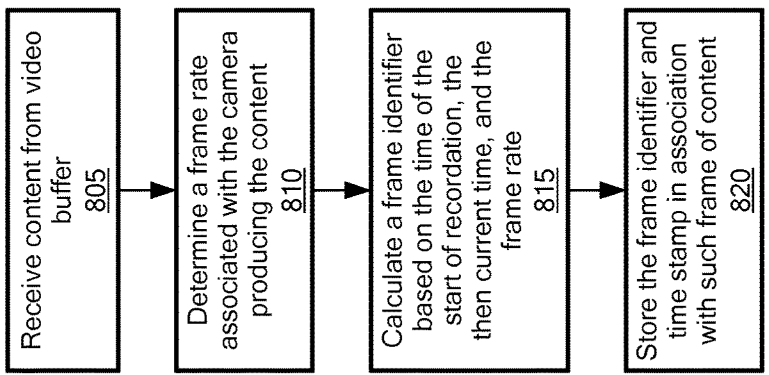
FIG. 8 is a block diagram illustrating processes involved in storing frames of content from the cameras in the system of FIG. 2.

FIG. 8 is a block diagram illustrating processes involved in storing frames of content from the cameras in the system of FIG. 2. Although steps 805-820 may be performed with respect to either the first camera 240 or the second camera 245, the steps are described in reference to the first camera 240 for illustrative purposes. The first camera 240 provides frames to the video buffer of the computing system 210. Consequently, the application 216 receives content from the video buffer (step 805). The application 216 determines the frame rate associated with the camera 240 producing the content (step 810). In some embodiments, the application 216 adjusts the rate at which frames are accepted from the camera 240. For example, if both cameras 240, 245 in communication with the computing system 210 are providing frames at the rate of 30 frames/second, the application 216 may be incapable of processing all of the content in real-time. To retain the maximum amount of data regarding emotional responses of the panel, the application 216 may accept frames from the second camera 245 at its normal frame rate. However, the application 216 may reduce the frame rate for the first camera 240 recording the presentation.

To ensure that frames associated with particular durations since the beginning of the recordings may be readily retrieved, the frame processing subsystem 225 calculates an identifier for each frame in the recordings. The frame identifier may be calculated based on the time of the start of recording, the then current time of the recording (e.g., the time stamp of the frame), and the frame rate of the camera 240 (step 815). For example, the frame processing subsystem 225 may subtract the then current time from the start of the recording, and multiply this period of time by the frame rate. The frame identifier, time stamp, and content of the frame are stored in association with one another in a video recording file in storage 217 (step 820). Because the frames are stored with time stamps, the video recordings may be played back in a synchronized manner.

Figure 9:
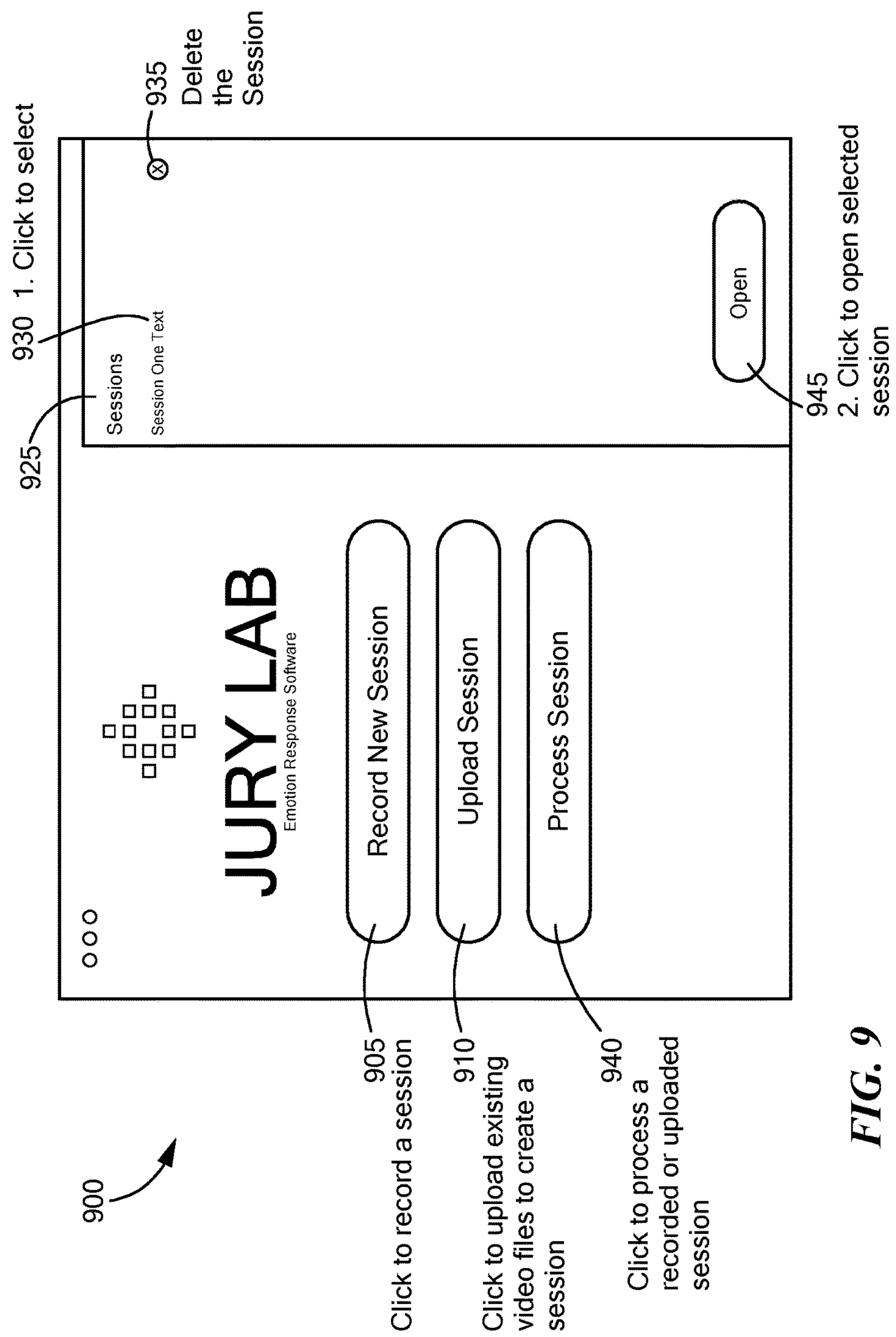
FIG. 9 is an exemplary user interface, displayed by the system of FIG. 2, for recording, uploading, or processing sessions of presentations and associated panels.
Figure 10:
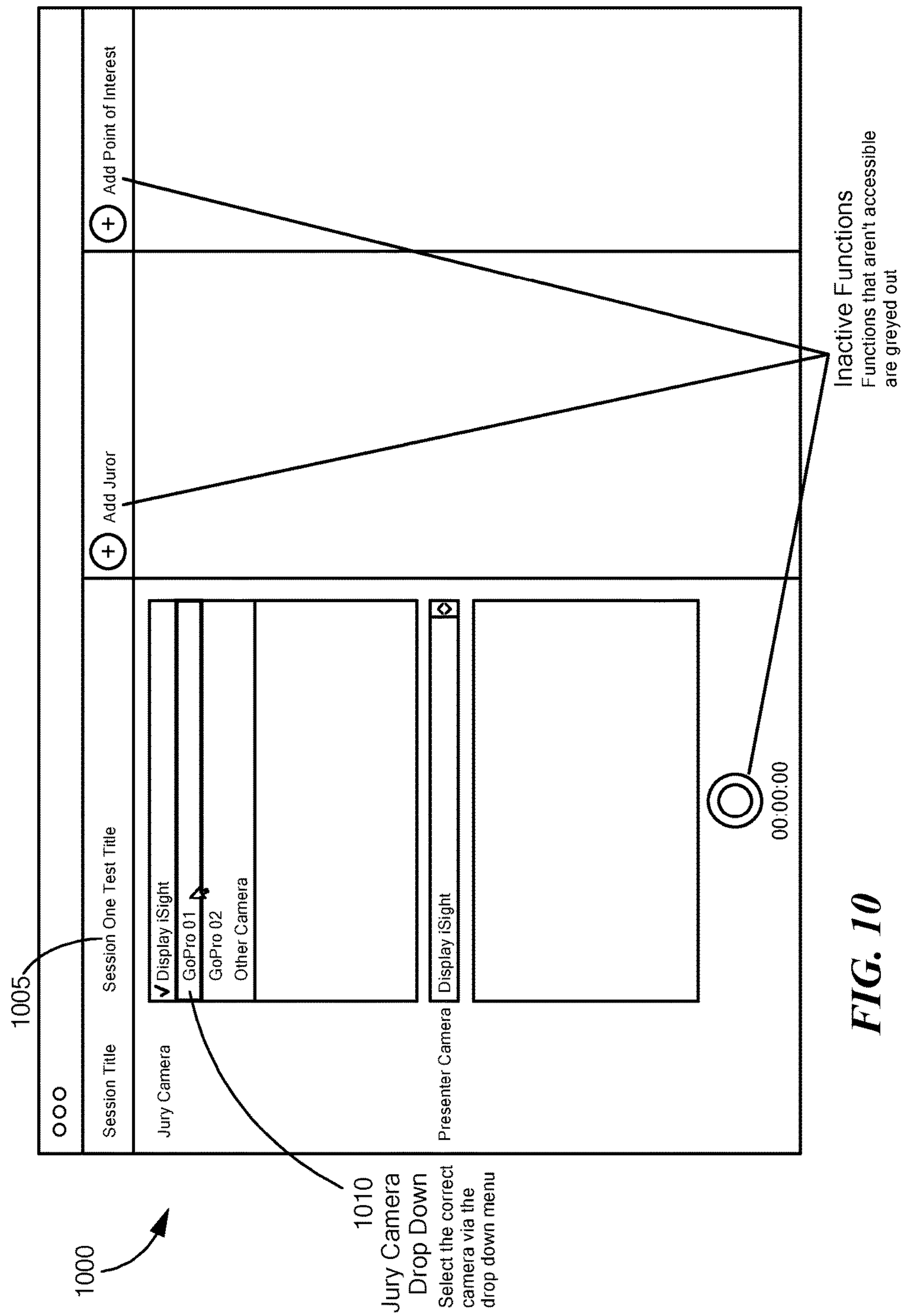
FIGS. 10-13 are exemplary user interfaces, displayed by the system of FIG. 2, illustrating the selection of cameras to provide video content for the recordings of the presentation and the panel.

FIG. 9 is an exemplary user interface 900, displayed by the system of FIG. 2, for recording, uploading, or processing sessions of presentations and associated panels. The user interface 900 includes buttons 905, 910, 915, and 920 that the user may select to interact with a session. In response to user selection of button 905, the application may display user interface 1000 in FIG. 10, from which the user may configure a session to be recorded. If the user selects button 910, the application 216 may display another user interface (not shown) from which the user may select files for a session to import to the application 216. The user interface 900 also includes a list 925 that displays sessions that have been stored by the application 216, and the list 925 includes an entry 930 for an exemplary session named "Session One Test". If the user selects the session 930, the user interface 900 activates three user controls: a button 935 to delete the session 930, a button 940 to process the session (e.g., process the panel recording for emotional responses), and a button 945 to open the session.

Figure 11:
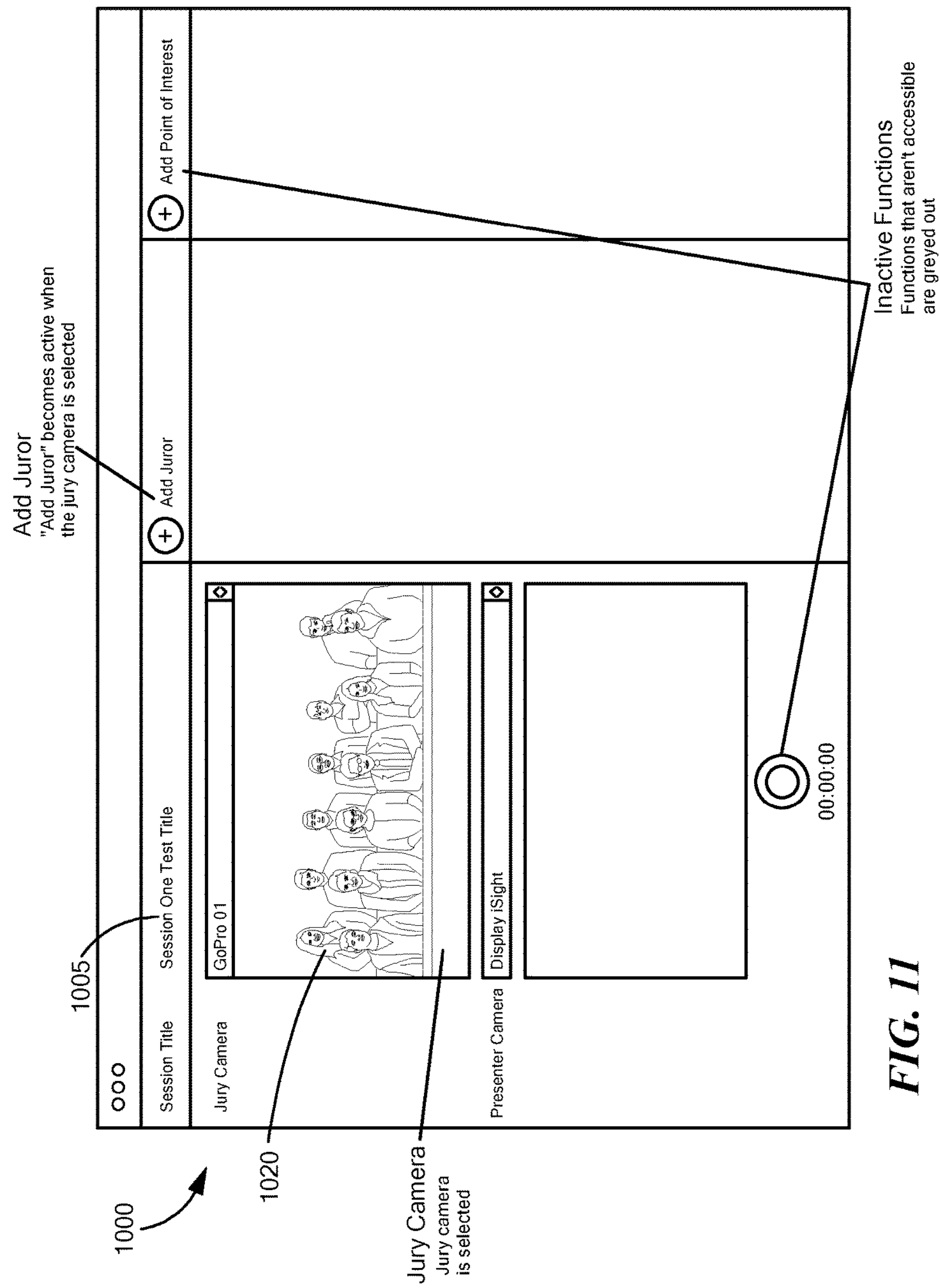

FIGS. 10-13 are exemplary user interfaces, displayed by the system of FIG. 2, illustrating the selection of cameras to provide video content for the recordings of the presentation and the panel. From the user interface 1000 depicted in FIG. 10, the user may configure a session to be recorded. The user may edit field 1005 to name the session. The user interface 1000 may include a menu 1010 of cameras from which the user may select a camera to provide video content for the panel recording. In this embodiment, the menu 1010 is a drop-down menu showing all of the cameras in communication with the computing system 210, and the user selects the camera named "GoPro 01" as the second camera 245 to record the panel. After the user selects "GoPro 01" for the second camera 245, the application displays video content from the camera in the user interface 1000, such as in window 1020, as shown in FIG. 11.

Figure 12:
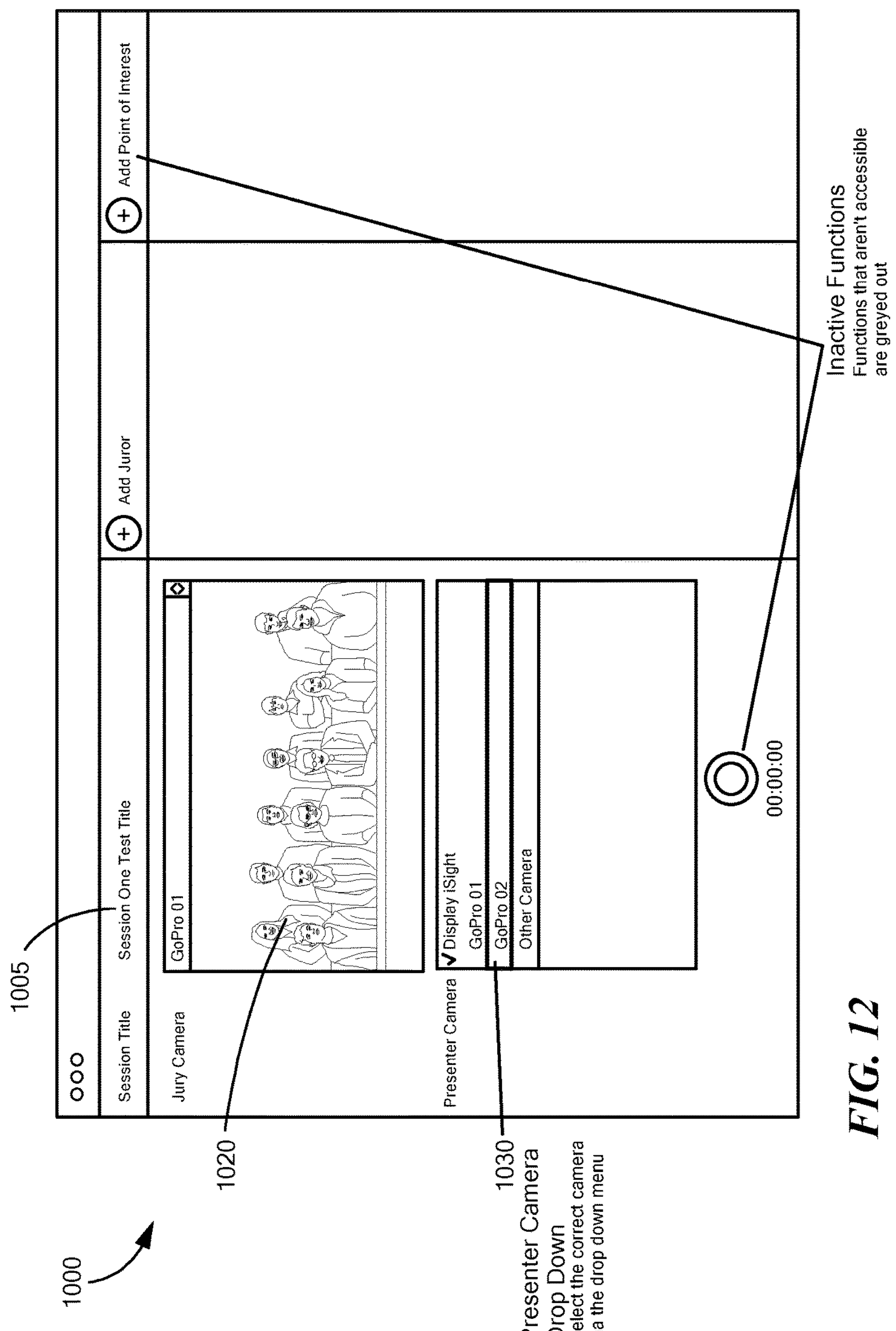
Figure 13:
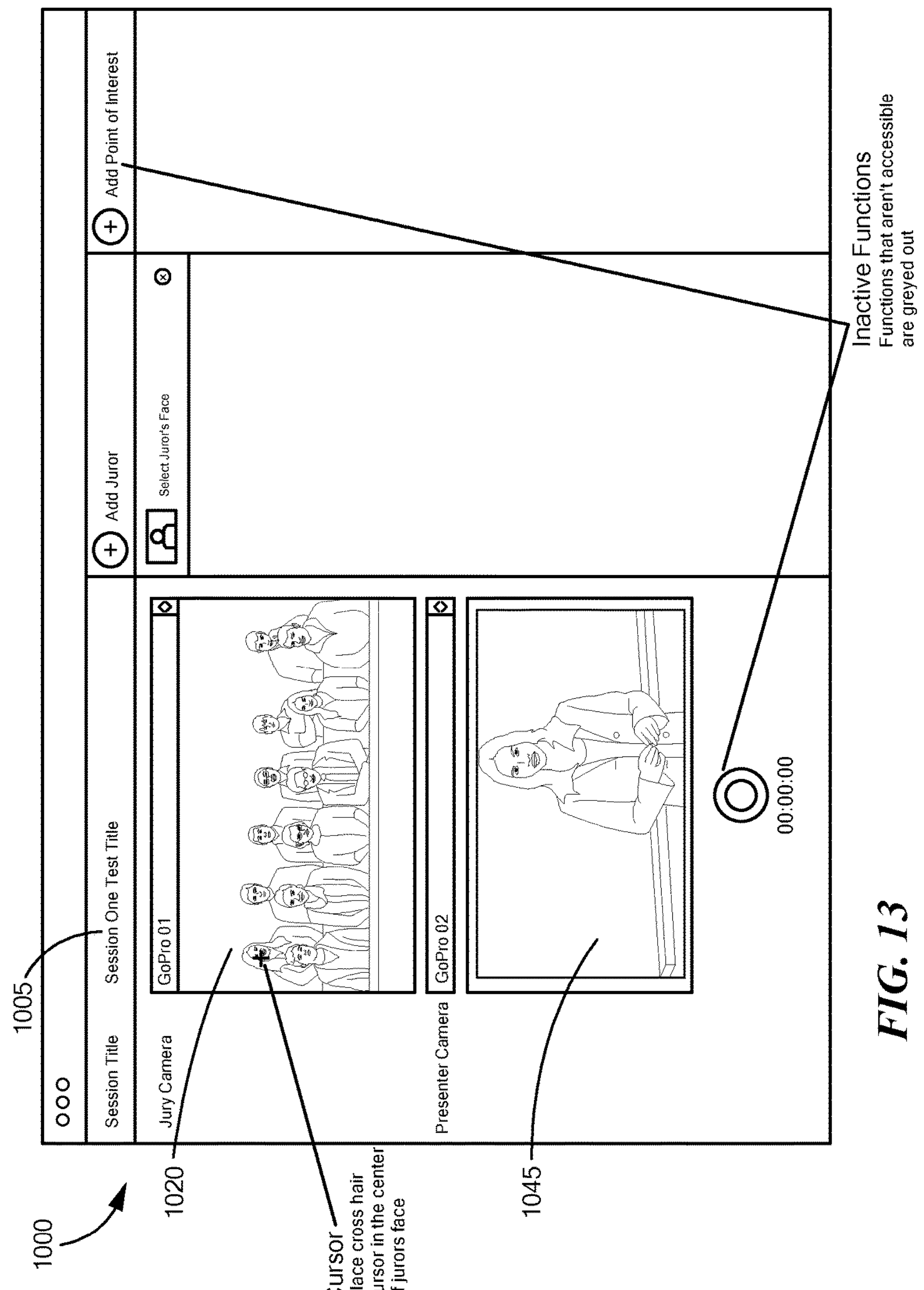

The user interface 1000 may also include a menu 1030 of cameras from which the user may select the first camera 240 to record the presentation, as shown in the user interface 1000 in FIG. 12. Like the menu 1010, the menu 1030 may display the cameras in communication with the computing system 210. When the user selects a camera from the menu 1030, the application displays audiovisual content from the selected first camera 240 in the window 1045 of the user interface 1000, as shown in FIG. 13.

Figure 14:
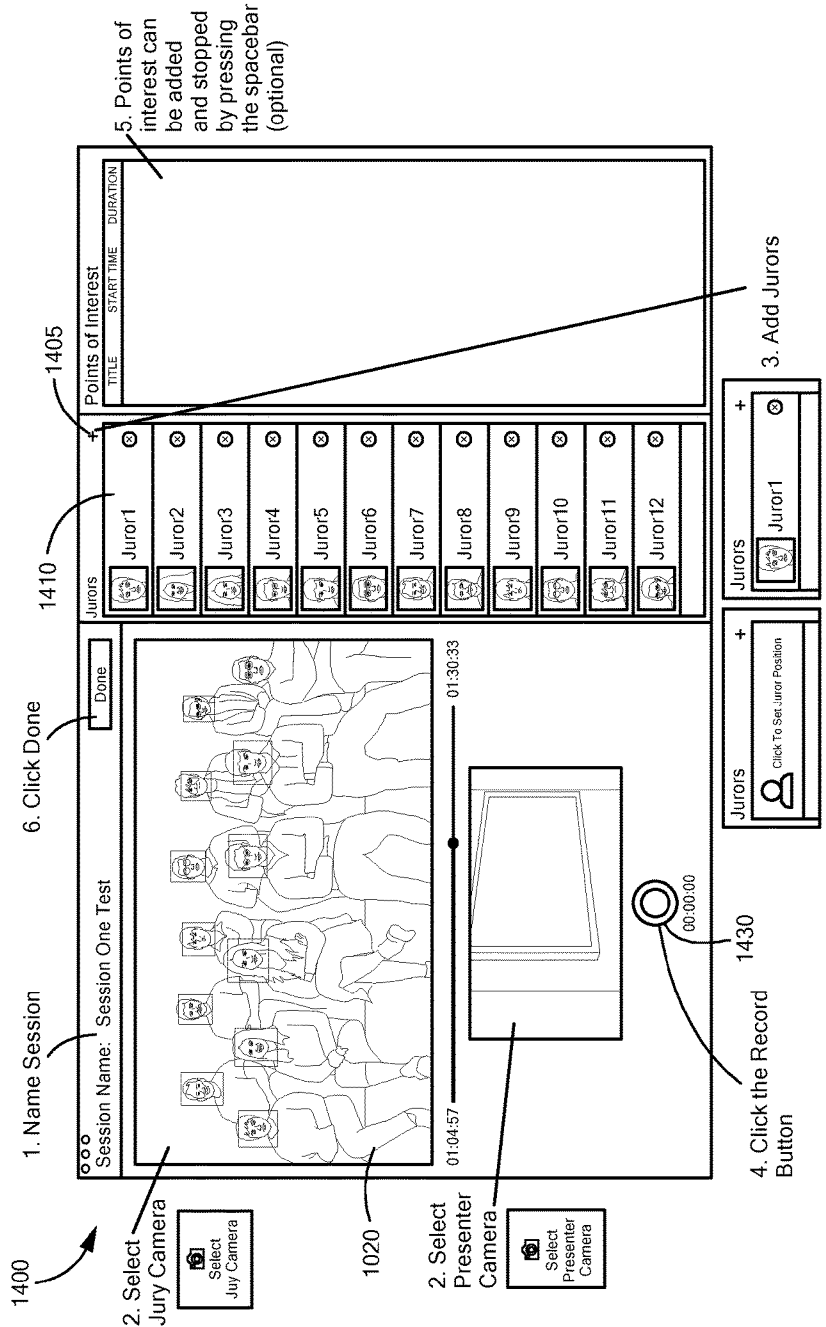
FIG. 14 is an exemplary user interface, displayed by the system of FIG. 2, illustrating the identification of locations of individuals on the panel.

FIG. 14 is an exemplary user interface 1400, displayed by the system of FIG. 2, illustrating the identification of locations of individuals on the panel. After the user selects the second camera 245 to record the panel, the application 216 permits the user to identify the locations of the individuals of the panel. For example, after the user selects the second camera 245, the application 216 activates a button 1405 for adding individuals to the panel. If the user selects the button 1405, the user interface 1400 displays the next frame received from the second camera 245 in the window 1020, and the application 216 temporarily disregards subsequently received frames. The application 216 creates a field 1410 for an individual, and the user selects the location of the individual's face in the displayed frame 1020. In some embodiments, the user selects the center of an individual's face, and in other embodiments, the user draws a rectangle circumscribing the face in the frame. The user may edit the field 1410 to provide a name, or other identifier, for the individual. By repeating these steps, the user may add additional individuals until all of the members of the panel have been accounted for. The application 216 saves the identified locations of the individuals with the session identifier in storage 217.

The user interface 1400 also includes a record button 1430. When the user selects the record button 1430, the frame processing subsystem 225 processes audiovisual content provided by the first and second cameras 240, 245 to create the video recordings of the presentation and panel. Selecting the record button 1430 again stops the recording, and the frame processing subsystem 225 completes the video recordings with the final frames provided by the cameras 240, 245 before the record button 1430 was selected again.

Figure 15:
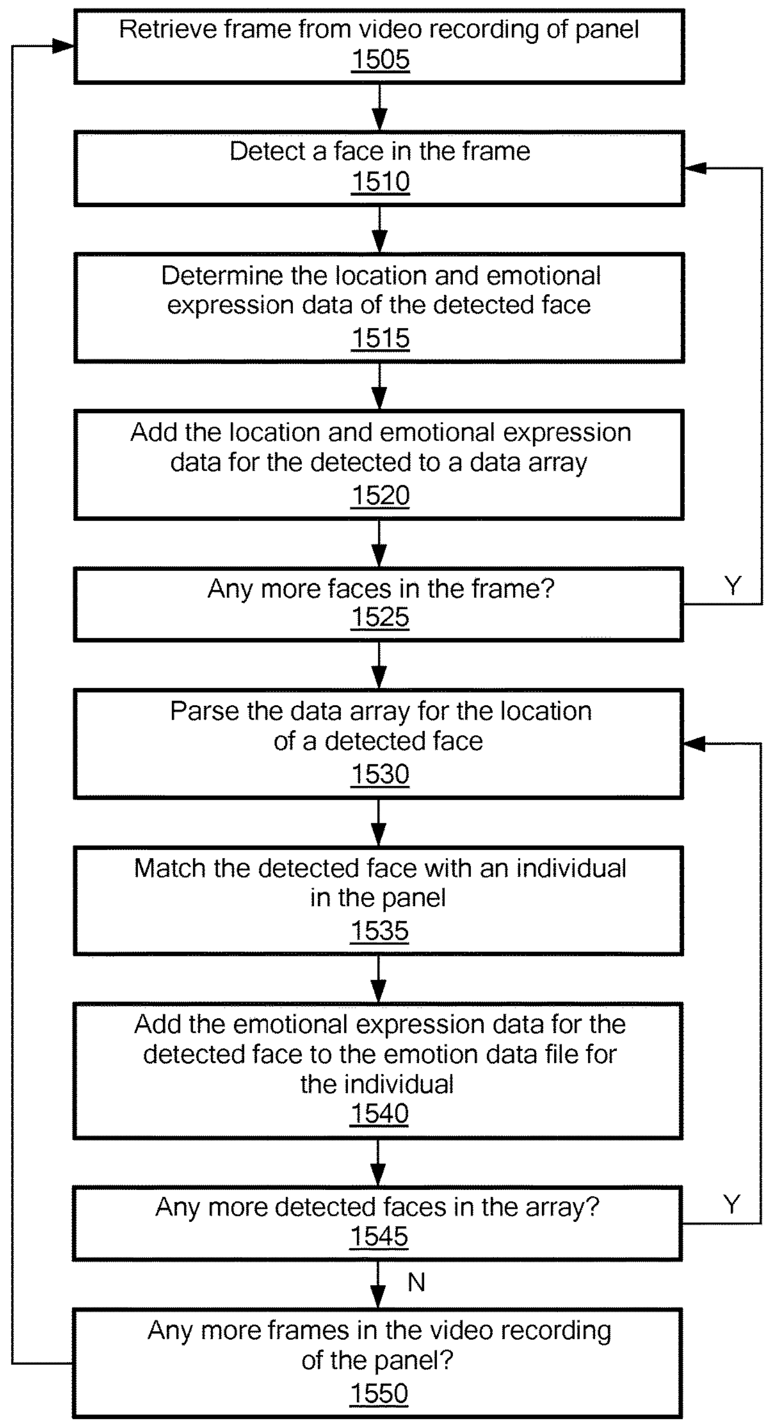
FIG. 15 is a block diagram illustrating processes involved in obtaining and storing emotional expression data of faces in a frame of a video recording of the panel.

FIG. 15 is a block diagram illustrating processes involved in obtaining and storing emotional expression data of faces in a frame of a video recording of the panel. To analyze the panel recording for emotional responses of the individuals, the frame processing subsystem 225 retrieves a frame of the panel recording from storage 217 (step 1505) and provides the frame to the emotion analyzer subsystem 220. The emotion analyzer subsystem 220 detects a face in the frame (step 1510), determines the location and emotional expression data for the face (step 1515), and adds the location and emotional expression data for the face to a data array (step 1520). The emotion analyzer subsystem 220 continues performing these steps until no more faces are detected in the frame (step 1525), and then passes the data array to the frame processing subsystem 225. The frame processing subsystem 225 parses the data array to obtain the location of a detected face (step 1530) and matches the face with an identified individual in the panel (step 1535), according to any of the methods described above. If a detected face matches an individual, the frame processing subsystem 225 adds the emotional expression data for the face to a file of emotion data for the individual (step 1540). The frame processing subsystem 225 repeats these steps for every detected face in the data array (step 1545), and every data array for every frame in the video recording (step 1550) until the entire panel recording is processed.

Figure 16:
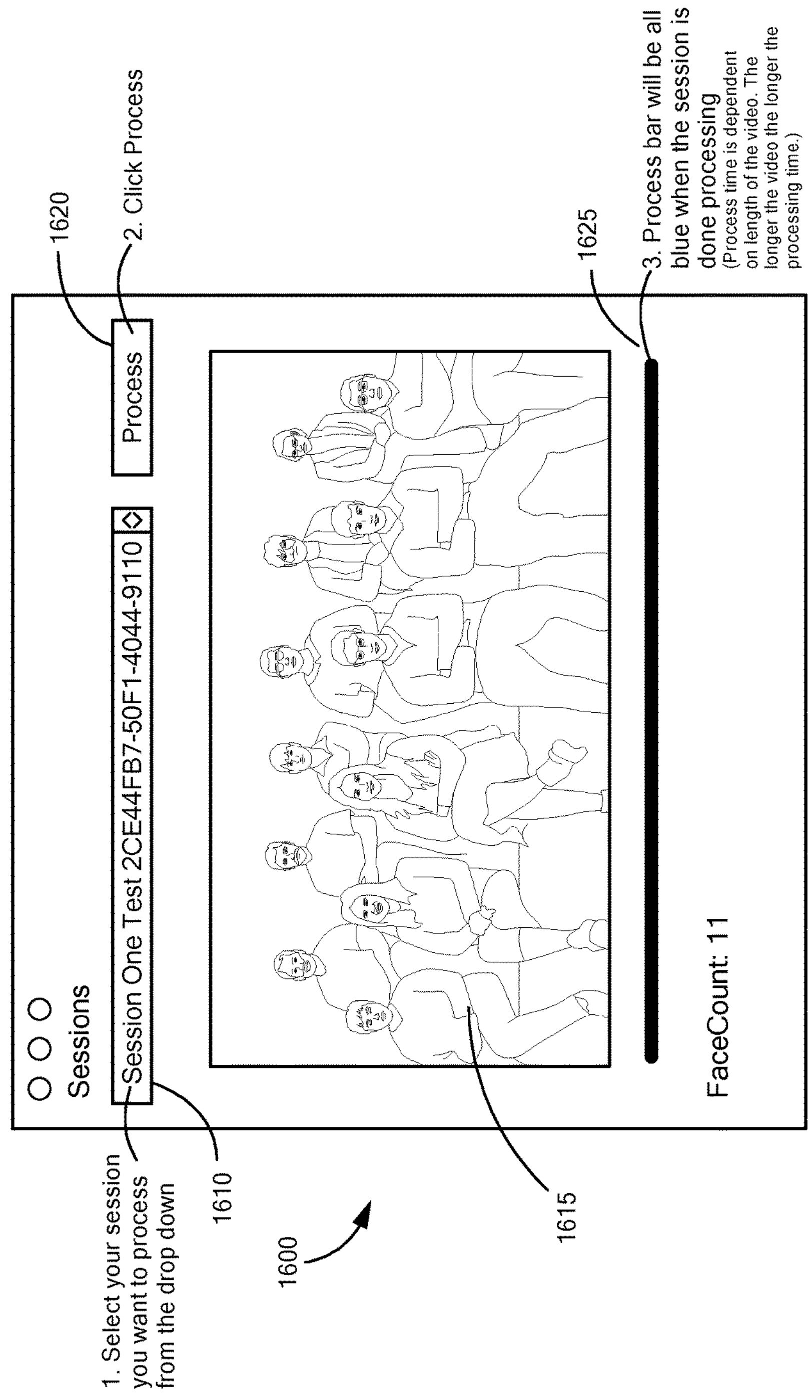
FIG. 16 is an exemplary user interface, displayed by the system of FIG. 2, illustrating the user input for processing a video recording of panel for emotional expression data of the individuals.

FIG. 16 is an exemplary user interface, displayed by the system of FIG. 2, illustrating the user input for processing a video recording of panel for emotional expression data of the individuals. The user interface 1600 includes a drop-down menu 1610 of recorded and stored sessions. When the user selects a session from the menu 1610, the application 216 may display an image of the panel in a window 1615 for the user to verify the identity of the session. Selecting the process button 1620 causes the emotion analyzer subsystem 220 and the frame processing subsystem 225 to analyze the panel recording of the session for the emotional responses of the individuals. In some embodiments, the user interface 1600 may display a progress bar 1625, which extends across the user interface 1600 until the panel recording has been completely processed.

Figure 17:
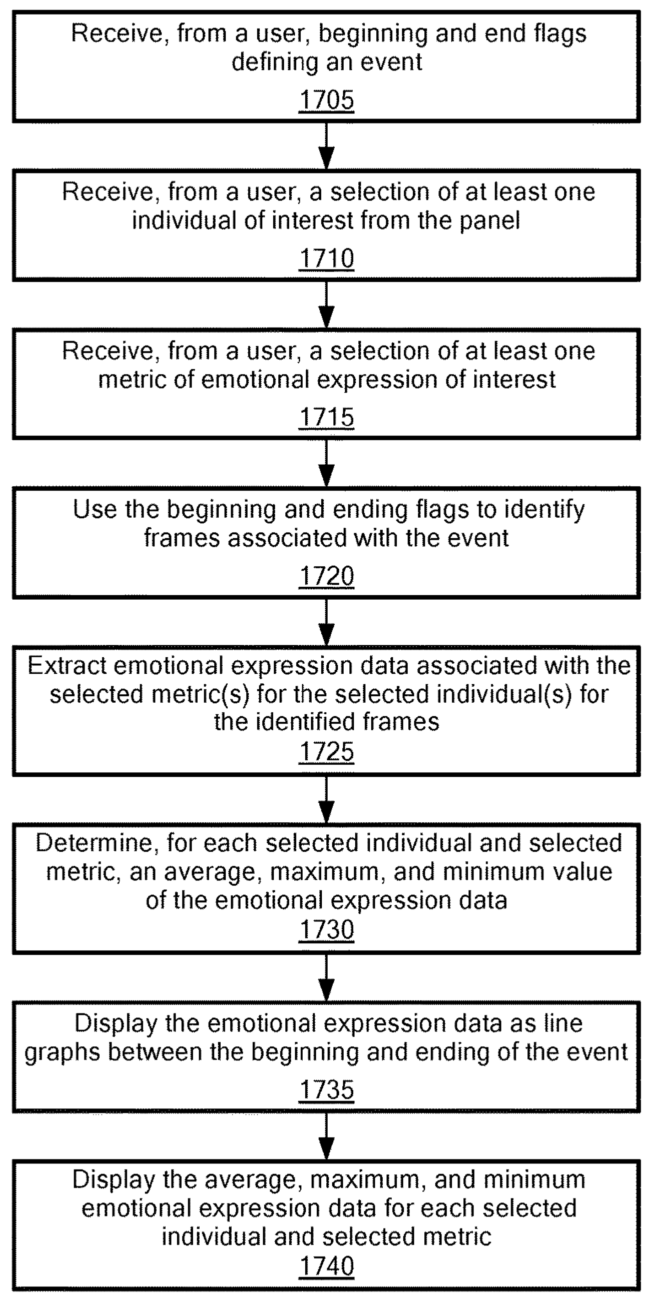
FIG. 17 is a block diagram illustrating processes involved in extracting and displaying emotional expression data, for individuals of interest, that are associated with an event.

FIG. 17 is a block diagram illustrating processes involved in extracting and displaying emotional expression data, for individuals of interest, that are associated with an event. After the application 216 processes the panel recording of the session for emotional responses, or after the user opens a stored session, the user may view the audiovisual recording of the presentation in tandem with the video recording of the panel. The application 216 loads the video recordings of the selected session for playback. Because the frames of the video recordings are time stamped, the application 216 can synchronize their display, even though the video recordings were obtained at different frame rates and include different numbers of frames. Thus, the application 216 enables the user may simultaneously view the presentation and the panel's response.

To assess the emotional responses of the panel at a user-selected level of granularity, the user may define an event within the presentation and select individuals and metrics of emotional expression of interest, and the application 216 organizes and displays the emotional expression data meeting the requirements of the user. The presentation processing subsystem 230 receives from the user beginning and end flags defining an event (step 1705). Each flag may identify a duration from the start of the presentation and panel recordings, such that the duration between the flags constitutes the beginning and ending of an event. In some embodiments, the user plays the presentation recording of the session and, at a desired position within the presentation, inputs a command to flag the position as the beginning of the event. Similarly, when the presentation reaches a subsequent desired position, the user inputs a command to flag the position in the presentation as the ending of the event. Alternatively, the user may scroll through the presentation to move from one position within the video recording to another, and input commands to flag the beginning and ending of events at the applicable durations within the presentation.

The presentation processing subsystem 230 receives from the user a selection of at least one individual of interest from the panel (step 1710). The presentation processing subsystem 230 also receives from the user a selection of at least one metric of emotional expression of interest (step 1715). The presentation processing subsystem 230 uses the beginning and ending flags to identify frames associated with the event (step 1720). As discussed above, the durations from the start of the presentation recording corresponding to the beginning and ending flags may be multiplied by the frame rate of the second camera 245 to determine the first and last identifiers for frames captured during the event.

The presentation processing subsystem 230 may extract from the database 218 emotional expression data associated with the selected metric(s) for the selected individual(s) for the identified frames (step 1725). In some embodiments, the presentation processing subsystem 230 filters the data in the database 218 to extract the desired data.

To prepare the extracted data for display, the presentation processing subsystem 230 determines, for each selected individual and selected metric, an average of the values for the emotional expression data obtained for the frames of the event (step 1730). The presentation processing subsystem 230 may also determine the maximum and minimum values for each metric (step 1730). The emotional expression data may be displayed as line graphs between the beginning and ending of the event (step 1735). For example, data for each metric may be represented as a different line on the graph. Furthermore, the average, maximum, and the minimum values for each selected individual and selected metric may be displayed to the user (step 1740).

At any time, the user may select different individuals of interest, as well as different metrics of emotional expression of interest. The presentation processing subsystem 230 extracts the corresponding set of emotional expression data from the database 218, based on the user selections, and displays the data to the user, according to any of the methods described above. Furthermore, the user may define additional events for which the presentation processing subsystem 230 may extract emotional expression data obtained at different durations within the presentation.

Figure 18:
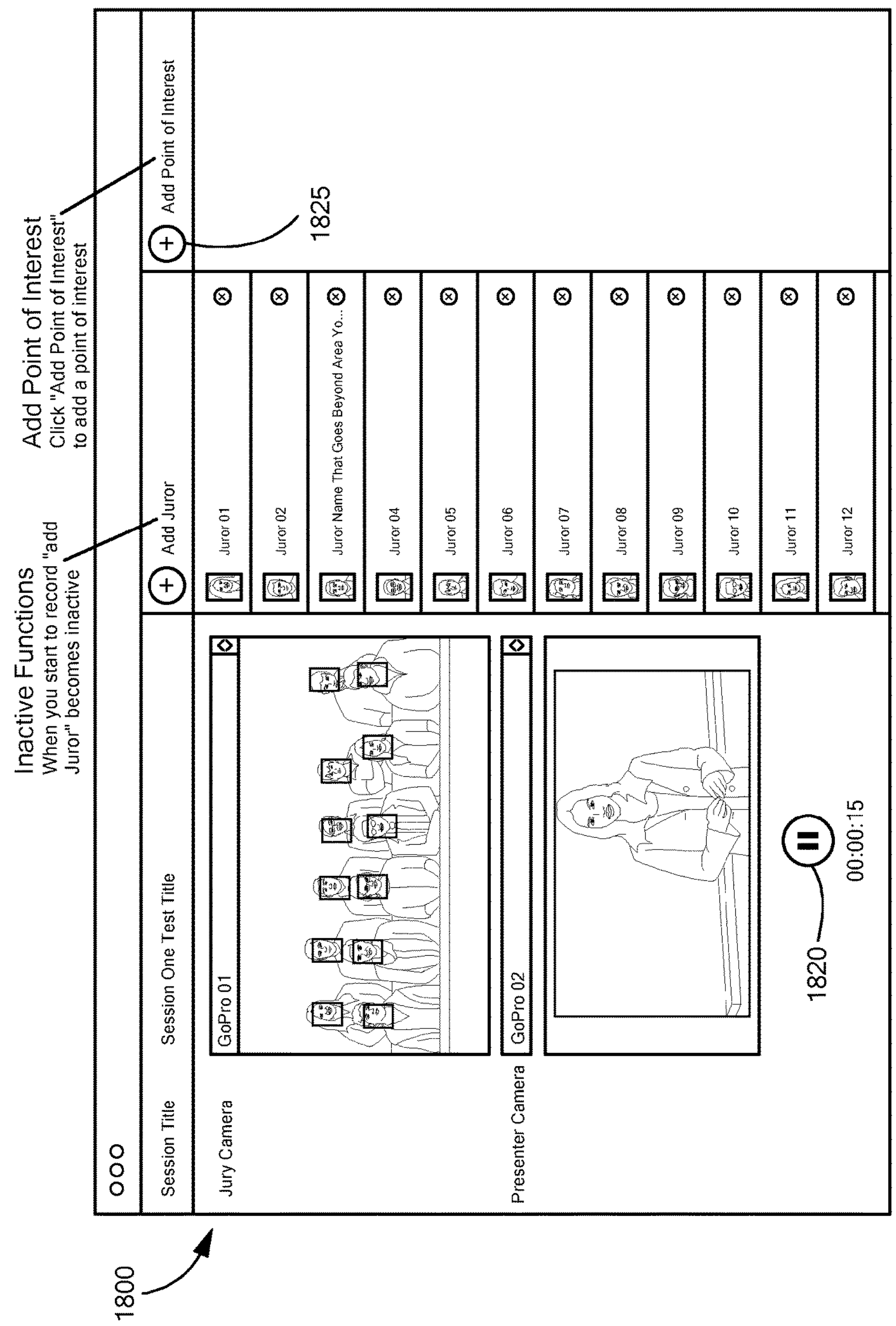
FIGS. 18-19 are exemplary user interfaces, displayed by the system of FIG. 2, illustrating user inputs to flag the beginning and ending of an event.
Figure 19:
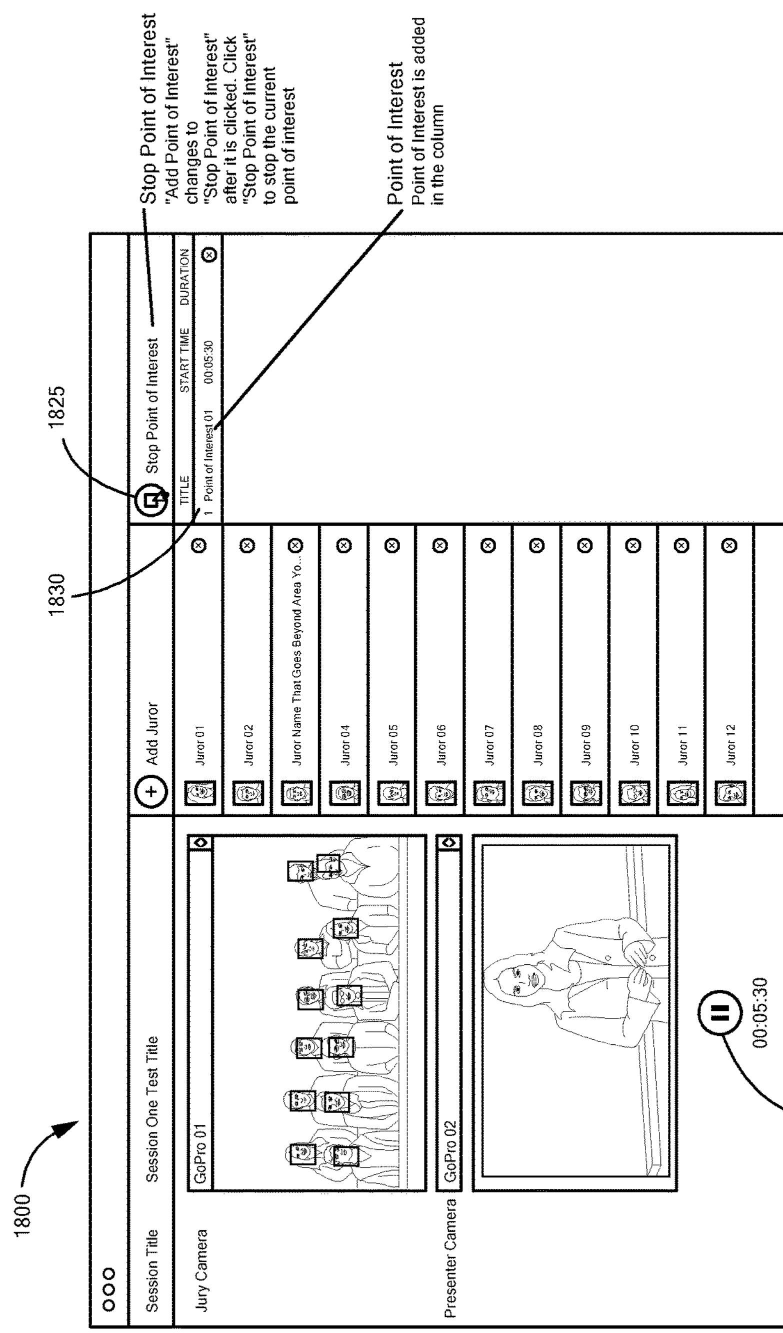
Figure 20:
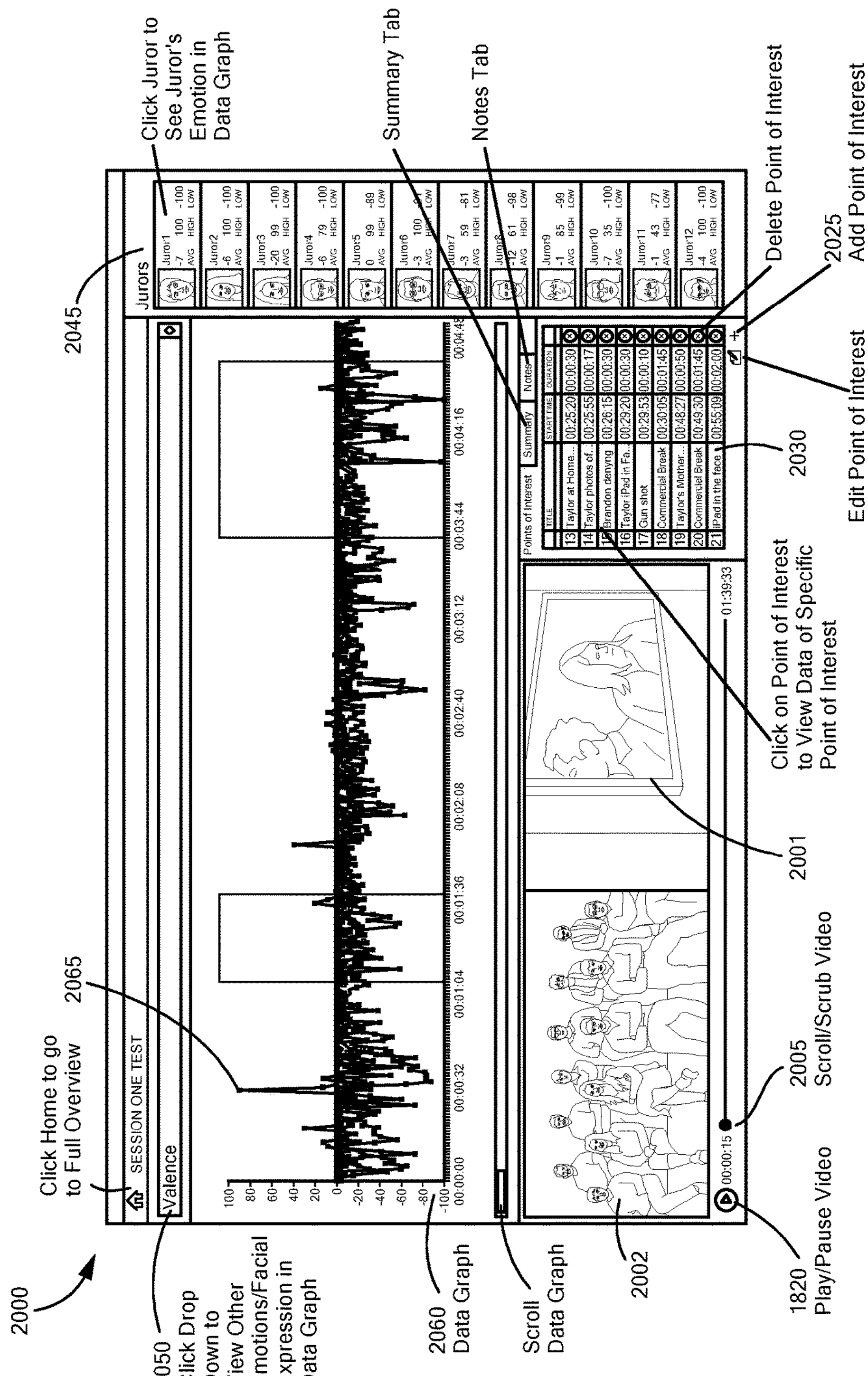
FIGS. 20-24 are exemplary user interfaces, displayed by the system of FIG. 2, that enable creation of events and display of emotional expression data, for individuals of interest, that are associated with an event.
Figure 21:
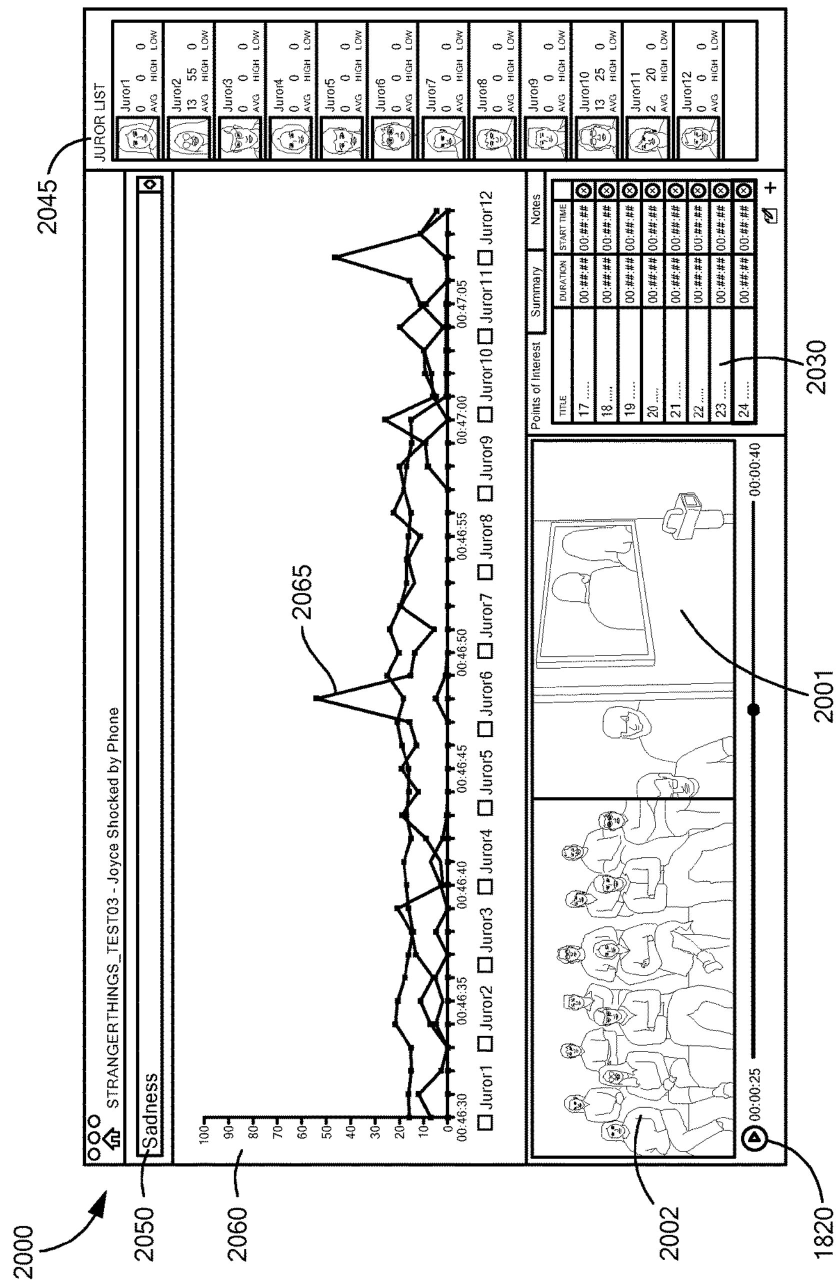
Figure 22:
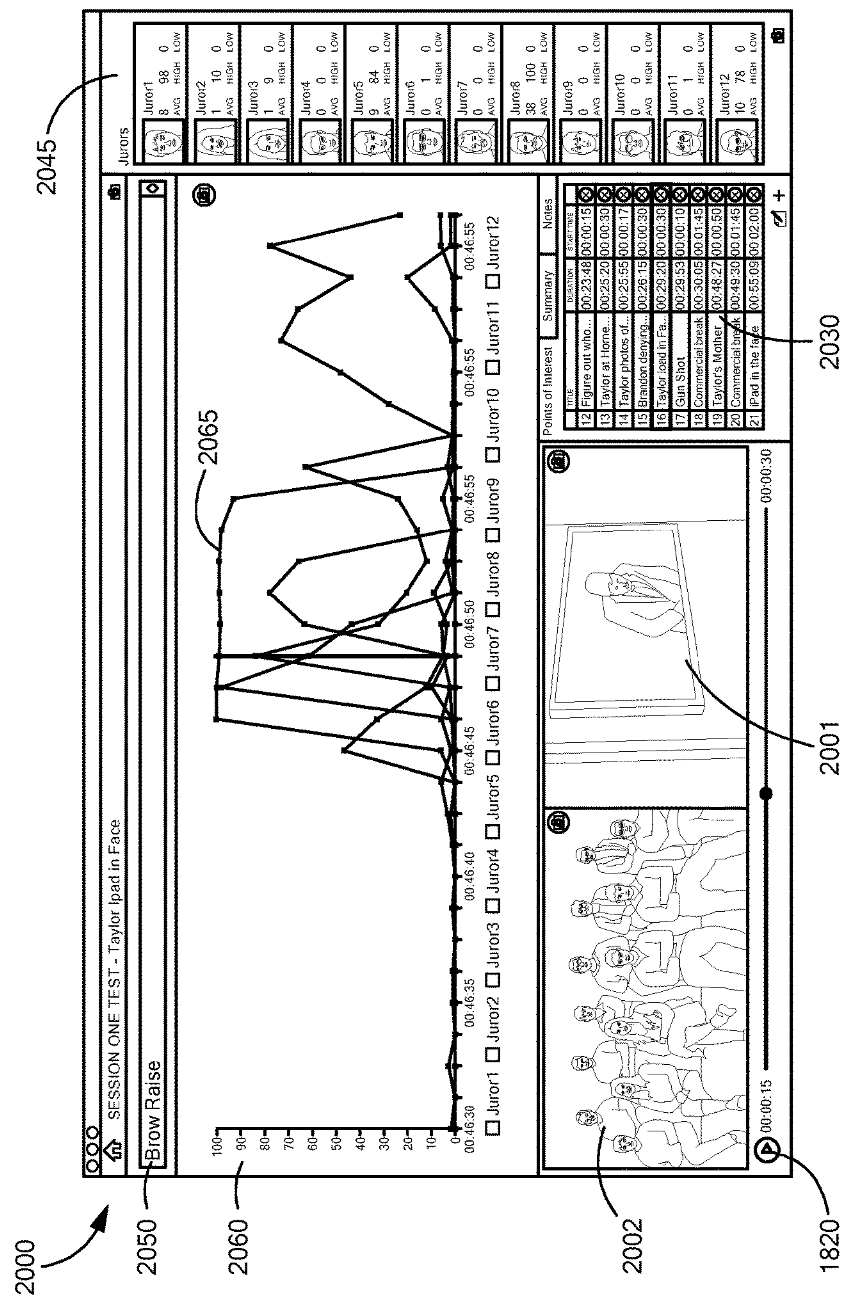
Figure 23:
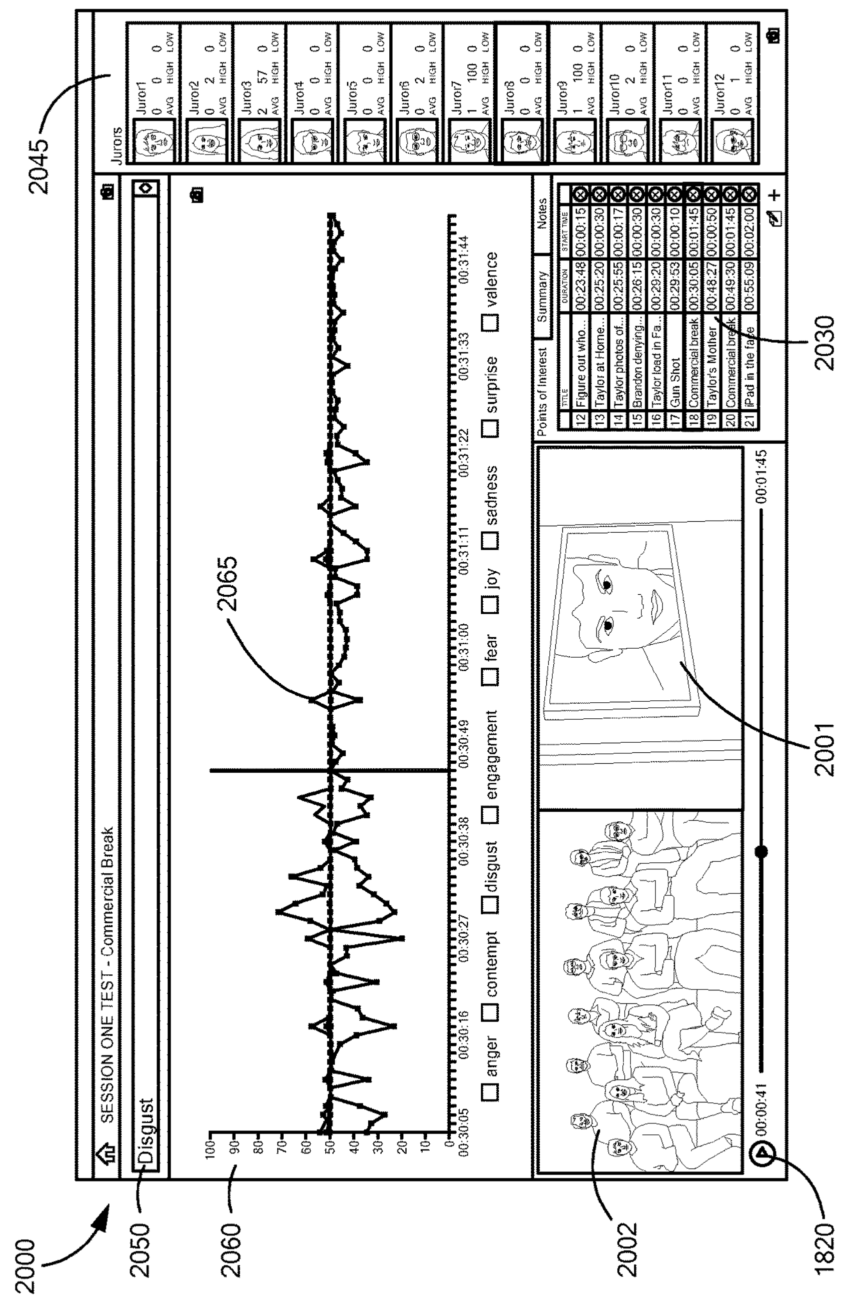
Figure 24:
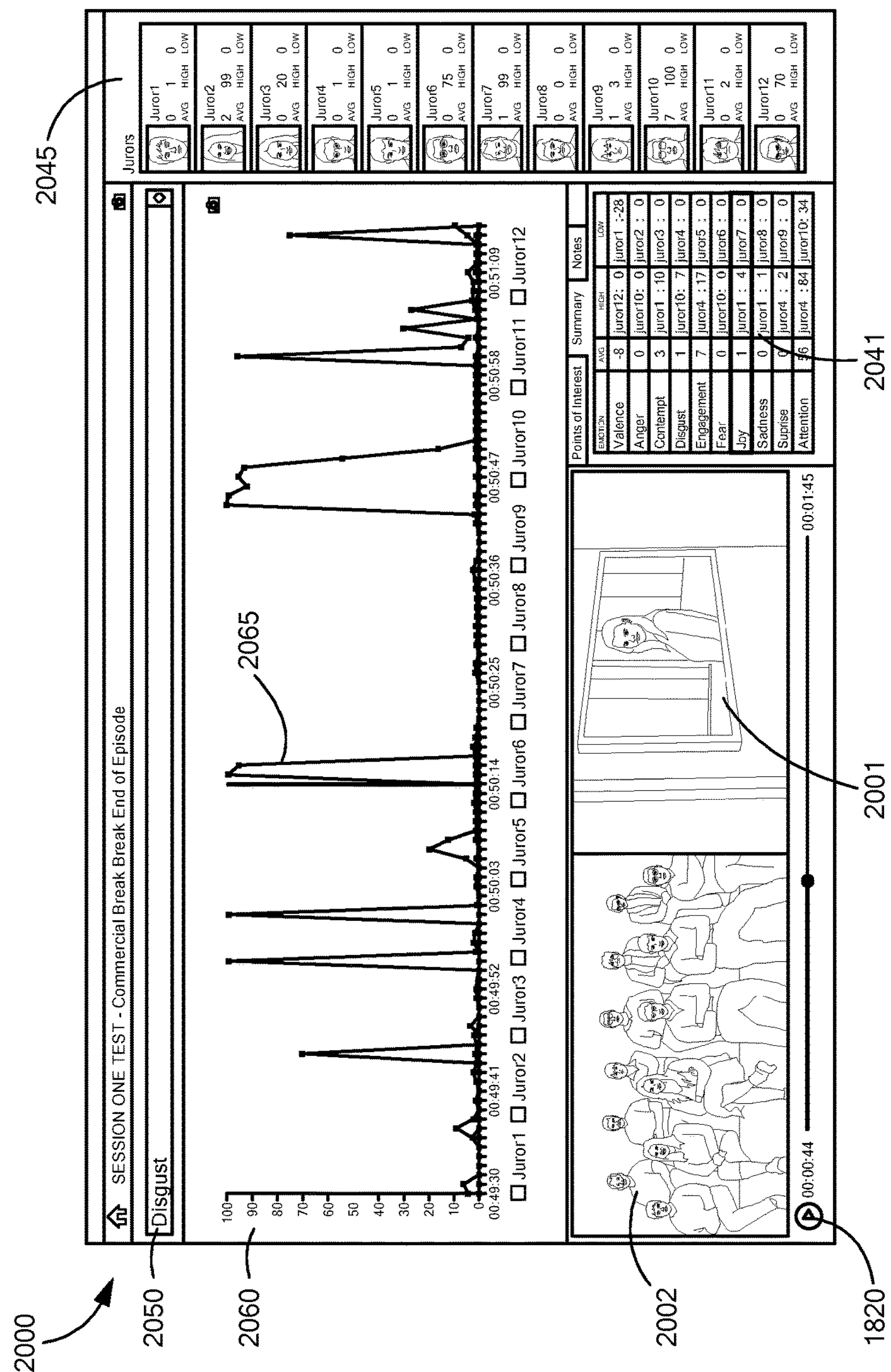

FIGS. 18-19 are exemplary user interfaces, displayed by the system of FIG. 2, illustrating user inputs to flag the beginning and ending of an event. The user interface 1800 includes a button 1820 for playing the video recordings of the presentation and the panel. When the presentation reaches the beginning of an event, the user may select the "Add Point of Interest" button 1825. The presentation processing subsystem 230 creates a new event and flags the position within the presentation when the user selected the button 1825 as the beginning of the event. After the "Add Point of Interest" button 1825 is selected, the presentation processing subsystem 230 changes the button 1825 to "Stop Point of Interest", as shown in FIG. 19. As the presentation recording continues to play, the user selects the "Stop Point of Interest" button 1825 to flag the ending of the event. The presentation processing subsystem 230 stores the beginning and ending times to define the event, and the user may edit the field 1830 to name the event.

FIGS. 20-24 are exemplary user interfaces, displayed by the system of FIG. 2, that enable creation of events and display of emotional expression data, for individuals of interest, that are associated with an event. The application 216 displays the presentation recording in one window 2001 of the user interface 2000 and the panel recording in another window 2002. The user interface 2000 includes both a playback button 1820 for playing the video recordings of the session and a scroll button 2005 for moving to a selected position within the video recordings. To create an event, user moves the scroll button 2005 to the desired position in the presentation recording, selects the "Add Point of Interest" button 2025, moves the scroll button 2005 to another position, and selects the same button 2025. The presentation processing subsystem 230 creates the event and stores identified beginning and ending times selected by the user. The events, including their names, beginning times, and ending times, may be displayed in a "Points of Interest" window 2030 in the user interface 2000.

To view emotional responses of individuals to events, the user selects an event from the "Points of Interest" window 2030. The user may select one or more individuals, from the displayed list 2045, for which the user wishes to view emotional expression data. The user may further select one or more metrics from a menu 2050 to specify the emotional expression data of interest. The presentation processing subsystem 230 extracts, from the database 218, emotional expression data associated with the selected metrics from the emotion data files of the selected individuals, for the range of frames corresponding to the event.

The presentation processing subsystem 230 displays the extracted data in a window 2060. The emotional expression data may be displayed as a line graph 2065 between the beginning and ending times of the event, as shown in the window 2060 of FIG. 21. To view the emotional responses from a different perspective, the user may select a different metric from the menu 2050, and the presentation processing subsystem 230 extracts the corresponding set of emotional expression data from the database 218 for display, as shown in the window 2060 of FIG. 22. The user may also select or deselect individuals from the menu 2045, as shown in the user interface 2000 of FIG. 23. In this manner, the user can focus on emotional responses from a subset of the panel, as well as the strengths of different emotional responses.

In other embodiments, the presentation processing subsystem 230 determines, for every selected metric of emotional expression data, the average of the values associated with the metric obtained during the event. The presentation processing subsystem 230 may also determine the maximum and minimum values. In some embodiments, in response to user selection of an individual of interest, the presentation processing subsystem 230 determines and displays the average, maximum, and minimum values for every metric of emotional expression data for the individual. When multiple individuals are selected, the presentation processing subsystem 230 may determine the average, maximum, and minimum values for individuals, as well as the average, maximum, and minimum values for the metrics with respect to the selected group of individuals, as demonstrated in window 2041 of FIG. 24. Thus, the user can assess the emotional responses to an event not just from one individual, but from a collective group of individuals.

For example, a user may wish to determine how effectively a presentation retained the panel's attention. The user may obtain a display based on the metric regarding attention, or the facial gesture of opened eyes directed to the camera (e.g., a proxy for attention). The display may reveal that between the 12th and 19th minutes of the presentation, 8 of the 10 individuals were not paying attention. Based on this information, that user may refine or eliminate that portion from future deliveries of the presentation.

In another example, such as a presentation given to a mock jury, a user may obtain a display of the valence of all individuals. One individual may exhibit a negative valence at the beginning of the presentation, but change from negative to positive at a particular point in the presentation and remain positive thereafter. Because the video recordings of the presentation and the panel are synchronized, the user may scroll to the identified point in the presentation to determine the event that triggered the change. In this manner, the user may determine that framing the issues to a jury trial in a particular manner, or presenting a particular piece of evidence, effectively engaged the individual that he or she began to enjoy the presentation.

In another example, in determining how to market a new product, a marketing company may create presentations highlighting different features of the product, show the presentations to focus groups, and record the focus groups' reactions to the presentations and their comments thereafter. A user may obtain displays regarding the groups' moments of engagement, joy, and surprise, as well as moments when individuals exhibited gestures such as smiles or opened mouths. The user may scroll to the points in the presentation when a majority of individuals in the group exhibited positive reactions, to identify which product features described in the presentation are most attractive. The company can emphasize these features in product campaigns.

Figure 27:
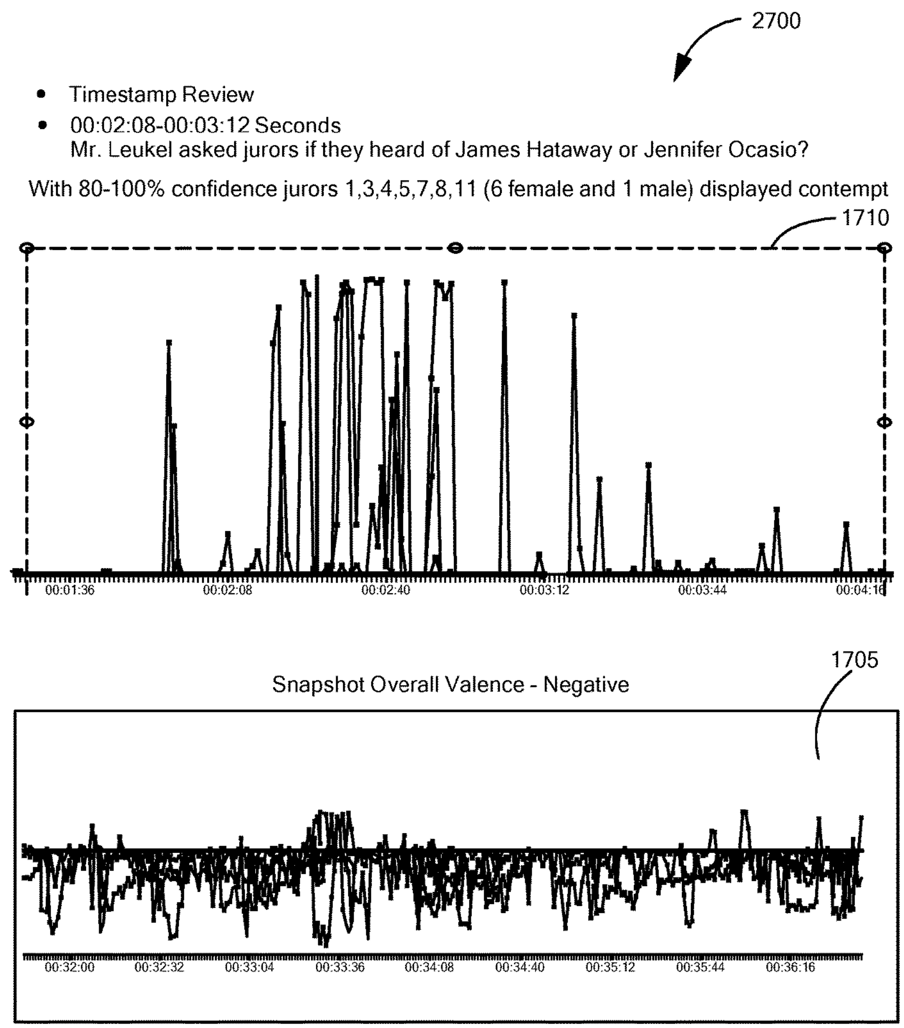

The application 216 may also allow the user to capture screenshots of the panel, an individual of the panel, and/or the display of emotional expression data, and export such images for use in a report. FIGS. 25-29 is a sample of an exemplary report that may be created using the system of FIG. 2. The report concerns the results of an opening statement, delivered to a mock jury, by the defense attorney for the defendant in an attempted murder case. The defendant had already been convicted and sentenced, and the defense attorney was weighing the strategy of requesting a reduction in the sentence. As shown in FIG. 27, the application 216 was used to determine that the overall valence of the panel during the opening statement was negative, as shown in window 2705. When the defense attorney mentioned a previous high profile criminal case involving the same defendant, 7 of the 12 members of the panel display contempt, as shown in window 2710. As shown in FIG. 28, one or more mock jurors displayed contempt in response to statements suggesting that a sentence was unduly harsh (window 2805), or that the case involved a miscarriage of justice (window 2810). In this manner, the application 216 could help the defense attorney conclude that the tactic was unlikely to succeed.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

While the invention has been particularly shown and described with reference to specific embodiments, it will be understood by those skilled in the art that various changes in form and detail may be made therein without departing from the spirit and scope of the invention as defined by the appended clauses. While some of these embodiments have been described in the claims by process steps, an apparatus comprising a computer with associated display capable of executing the process steps in the claims below is also included in the present invention. Likewise, a computer program product including computer executable instructions for executing the process steps in the claims below and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer-implemented method of assessing emotional responses of a panel of individuals to a user-defined event in a presentation, the method carried out by a computer system performing computer processes comprising:

associating, with a first file, a first video recording and an audio recording being made of a presentation captured by a first camera and, with a second file, a second video recording being made of the panel observing the presentation captured by a second camera;

storing the first and second files in a database, in association with a session identifier for the presentation;

receiving, by the computer system, for each individual in the panel, an identified location of such individual in an image captured by the second camera;

storing the identified locations in the database in association with the session identifier;

completing recordation of content of the presentation in the first and second files;

during or after the recordation, receiving and storing, in association with the session identifier, a user input flagging a beginning and an ending for the event;

for each frame in a set of frames in the second video recording of the panel observing the presentation, processing the second file by:

(a) sending such frame to an emotion analyzer subsystem;

(b) receiving, from the emotion analyzer subsystem, a data array for such frame that for each face in such frame, specifies a location of such face in the frame and emotional expression data corresponding to an emotional expression of such face;

(c) matching the location of each face in the data array with the corresponding location of the identified individual; and (d) storing in the database, for each face in the data array for which there is a match with the corresponding identified individual, the emotional expression data and an identifier for the frame in association with the corresponding identified individual;

using the beginning and ending flags to identify frames associated with the event;

using the identified frames to locate and extract, from the database, emotional expression data for the set of individuals of interest associated with the event; and displaying the extracted data.

2. The method of claim 1, wherein the identified location for each individual corresponds to a center of a face of the individual in the image, and the location of a face provided in the data array corresponds to boundaries circumscribing the face in the frame.

3. The method of claim 2, wherein matching the location of each face in the data array with the corresponding location of the identified individual comprises:

determining the individual whose identified location falls within the boundaries circumscribing the face in the frame.

4. The method of claim 2, wherein the identified location for each individual is represented by a pair of coordinates and the boundaries circumscribing the face in the frame are defined by four pairs of coordinates.

5. The method of claim 1, wherein the emotional expression data comprises metrics selected from the group consisting of anger, attention, contempt, disgust, engagement, fear, joy, sadness, surprise, valence, and combinations thereof.

6. The method of claim 1, wherein the emotional expression data comprises data indicating the presence of a gesture selected from the group consisting of furrowed eyebrow, raised eyebrow, raised chin, closed eyes, depressed corner of a lip, pressed lips, puckered lips, open mouth, wrinkled nose, smile, smirk, raised upper lip, and combinations thereof.

7. The method of claim 1, further comprising:

wherein storing the user input flagging the beginning and the ending for the event includes storing flag data defining, within the presentation, first and second durations from the start of recordation to the beginning and to the ending of the event.

8. The method of claim 1, wherein using the beginning and ending flags to identify the frames associated with the event comprises:

using the flag data to identify the frames with time stamps falling between the beginning and the ending of the event.

9. The method of claim 7, wherein using the beginning and ending flags to identify the frames associated with the event comprises:

determining a first frame identifier, corresponding to the beginning frame of the event, by multiplying the first duration by the frame rate of a camera; and determining a second frame identifier, corresponding to the ending frame of the event, by multiplying the second duration by the frame rate of the camera.

10. The method of claim 1, further comprising:

receiving, from a user, a selection of at least one individual of interest in the panel and a selection of at least one metric of emotional expression of interest.

11. The method of claim 9, wherein using the identified frames to extract the emotional expression data comprises:

extracting, from the database, emotional expression data associated with the at least one selected metric for the at least one selected individual of interest.

12. The method of claim 10, wherein displaying the extracted data comprises:

displaying, for each selected individual of interest, the emotional expression data associated with the at least one selected metric as a line graph between the beginning and the ending of the event.

13. The method of claim 10, further comprising:

determining, for each selected individual of interest and for each selected metric, a value, of the emotional expression data for the frames associated with the event, selected from the group consisting of an average value, a maximum value, a minimum value, combinations thereof.

14. The method of claim 12, wherein displaying the extracted data comprises:

displaying, for each selected individual of interest and for each selected metric, the average value, the maximum value, and the minimum value of the emotional expression data for the frames associated with the event.

15. A computer program product, including a non-transitory computer readable medium, having computer code thereon for assessing emotional responses of a panel of individuals to a user-defined event in a presentation, the computer program product comprising:

program code for associating, with a first file, a first video recording and an audio recording being made of a presentation captured by a first camera and, with a second file, a second video recording being made of the panel observing the presentation captured by a second camera;

program code for storing the first and second files in a database, in association with a session identifier for the presentation;

program code for receiving for each individual in the panel, an identified location of such individual in an image captured by the second camera;

program code for storing the identified locations in the database in association with the session identifier;

program code for completing recordation of content of the presentation in the first and second files;

program code for, during or after the recordation, receiving and storing, in association with the session identifier, a user input flagging a beginning and an ending for the event;

program code for, for each frame in a set of frames in the second video recording of the panel observing the presentation, processing the second file by:

(a) sending such frame to an emotion analyzer subsystem;

(b) receiving, from the emotion analyzer subsystem, a data array for such frame that for each face in such frame, specifies a location of such face in the frame and emotional expression data corresponding to an emotional expression of such face;

(c) matching the location of each face in the data array with the corresponding location of the identified individual; and (d) storing in the database, for each face in the data array for which there is a match with the corresponding identified individual, the emotional expression data and an identifier for the frame in association with the corresponding identified individual;

program code for using the beginning and ending flags to identify frames associated with the event;

program code for using the identified frames to locate and extract, from the database, emotional expression data for the set of individuals of interest associated with the event; and program code for displaying the extracted data.

16. The computer program product of claim 15, further comprising:

program code for determining the individual whose identified location falls within the boundaries circumscribing the face in the frame.

17. The computer program product of claim 15, further comprising:

program code for using the flag data to identify the frames with time stamps falling between the beginning and the ending of the event.

18. The computer program product of claim 15, further comprising:

program code for storing flag data defining, within the presentation, first and second durations from the start of recordation to the beginning and to the ending of the event.

19. The computer program product of claim 18, further comprising:

program code for determining a first frame identifier, corresponding to the beginning frame of the event, by multiplying the first duration by the frame rate of a camera; and program code for determining a second frame identifier, corresponding to the ending frame of the event, by multiplying the second duration by the frame rate of the camera.

20. The computer program product of claim 15, further comprising:

program code for receiving, from a user, a selection of at least one individual of interest in the panel and a selection of at least one metric of emotional expression of interest; and program code for extracting, from the database, emotional expression data associated with the at least one selected metric for the at least one selected individual of interest.

* * * * *